United States Patent
Wesel et al.

(10) Patent No.: US 12,418,361 B2
(45) Date of Patent: Sep. 16, 2025

(54) SYSTEMS AND METHODS FOR COMMUNICATING USING SHORT MESSAGES

(71) Applicant: The Regents of the University of California, Oakland, CA (US)

(72) Inventors: Richard Wesel, Manhattan Beach, CA (US); Linfang Wang, Los Angeles, CA (US); Dan Song, Los Angeles, CA (US); Felipe Areces, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/500,000

(22) Filed: Nov. 1, 2023

(65) Prior Publication Data
US 2024/0154721 A1    May 9, 2024

Related U.S. Application Data

(60) Provisional application No. 63/421,213, filed on Nov. 1, 2022.

(51) Int. Cl.
*H04L 1/18*    (2023.01)
*H04L 1/00*    (2006.01)
*H04L 1/20*    (2006.01)

(52) U.S. Cl.
CPC ............ *H04L 1/006* (2013.01); *H04L 1/0061* (2013.01); *H04L 1/206* (2013.01)

(58) Field of Classification Search
None
See application file for complete search history.

(56) References Cited

U.S. PATENT DOCUMENTS

| 5,297,170 A * | 3/1994 | Eyuboglu | H03M 7/3082 375/241 |
| 10,200,231 B1 * | 2/2019 | Lefevre | H04L 27/3411 |

(Continued)

OTHER PUBLICATIONS

Amari et al., "Introducing Enumerative Sphere Shaping for Optical Communication Systems with Short Blocklengths", Journal of Lightwave Technology, vol. 37, No. 23, Dec. 1, 2019, pp. 5926-5936, doi: 10.1109/JLT.2019.2943938.

(Continued)

*Primary Examiner* — Mujtaba M Chaudry
(74) *Attorney, Agent, or Firm* — KPPB LLP

(57) ABSTRACT

Communication systems and methods are disclosed that utilize Probability Amplitude Shaping (PAS) and Trellis Coded Modulation (TCM) to transmit short block-length messages. While capacity-approaching codes, such as Low Density Parity Check (LDPC) codes, Turbo codes, and Polar codes, can achieve data rates approaching the Shannon limit at large block-lengths, the performance of these codes can deteriorate dramatically at short block-lengths. Communication systems configured in accordance with various embodiments of the invention can utilize classical codes to encode short block-length messages to achieve communication rates exceeding Polyanskiy's Random Coding Union bound. In several embodiments, message bits are transmitted using a TCM system in which message bits that have been previously encoded by an error detection code are encoded using a convolutional code (CC). In a number of embodiments, the error detection code and the CC are obtained via a joint optimization with respect to a Frame Error Rate bound.

26 Claims, 15 Drawing Sheets
(10 of 15 Drawing Sheet(s) Filed in Color)

(56) References Cited

U.S. PATENT DOCUMENTS

| | | | |
|---|---|---|---|
| 10,951,455 B2* | 3/2021 | Böcherer | H04L 27/3433 |
| 2009/0103568 A1* | 4/2009 | Garba | H04L 1/005 |
| | | | 370/479 |
| 2010/0322348 A1* | 12/2010 | Tomezak | H04L 25/022 |
| | | | 375/298 |
| 2019/0342138 A1* | 11/2019 | Böcherer | H04B 10/541 |

OTHER PUBLICATIONS

Amjad et al., "Algorithms for simulation of discrete memoryless sources", Thesis for: Masters in Communication Engineering, Technical University of Munich, Oct. 29, 2013, 93 pgs.

Barsoum et al., "Constellation Design via Capacity Maximization", IEEE International Symposium on Information Theory, Nice, France, 2007, pp. 1821-1825, doi: 10.1109/ISIT.2007.4557486.

Biglieri et al., "High-Level Modulation and Coding for Nonlinear Satellite Channels", IEEE Transactions on Communications, vol. 32, No. 5, May 1984, pp. 616-626, doi: 10.1109/TCOM.1984.1096103.

Bocherer, "Achievable Rates for Probabilistic Shaping", arXiv:1707.01134v4 [cs.IT], Dec. 8, 2017, 21 pgs.

Bocherer et al., "Bandwidth Efficient and Rate-Matched Low-Density Parity-Check Coded Modulation", arXiv: 1502.02733v2 [cs.IT], Apr. 22, 2015, 13 pgs.

Bocherer et al., "Probabilistic Shaping and Forward Error Correction for Fiber-Optic Communication Systems", Journal of Lightwave Technology, vol. 37, No. 2, Jan. 15, 2019, pp. 230-244, doi: 10.1109/JLT.2019.2895770.

Buchali et al., "Rate Adaptation and Reach Increase by Probabilistically Shaped 64-QAM: An Experimental Demonstration", Journal of lightwave technology, vol. 34, No. 7, Apr. 1, 2016, pp. 1599-1609, doi: 10.1109/JLT.2015.2510034.

Cho et al., "Probabilistic Constellation Shaping for Optical Fiber Communications", Journal of Lightwave Technology, vol. 37, No. 6, Mar. 15, 2019, pp. 1590-1607, doi: 10.1109/JLT.2019.2898855.

Coskun et al., "Efficient Error-Correcting Codes in the Short Blocklength Regime", arXiv: 1812.08562v2 [cs.IT], Mar. 10, 2019, 48 pgs.

Fehenberger et al., "Multiset-Partition Distribution Matching", IEEE Transactions on Communications, vol. 67, No. 3, Mar. 2019, pp. 1885-1893, doi: 10.1109/TCOMM.2018.2881091.

Forney et al., "Efficient Modulation for Band-Limited Channels", IEEE Journal on Selected Areas in Communications, vol. SAC-2, No. 5, Sep. 1984, pp. 632-647, doi: 10.1109/JSAC.1984.1146101.

Forney et al., "Trellis shaping", IEEE Transactions on Information Theory, vol. 38, No. 2, Mar. 1992, pp. 281-300, doi: 10.1109/18.119687.

Fragouli et al., "Turbo Codes with Non-Uniform Constellations", ICC 2001, IEEE International Conference on Communications. Conference Record (Cat. No.01CH37240), vol. 1, 2001, pp. 70-73, doi: 10.1109/ICC.2001.936275.

Geiselhart et al., "Automorphism Ensemble Decoding of Quasi-Cyclic LDPC Codes by Breaking Graph Symmetries", arXiv:2202.00287v1, Feb. 1, 2022, 5 pgs.

Gültekin et al., "Probabilistic Shaping for Finite Blocklengths: Distribution Matching and Sphere Shaping", Entropy, vol. 22, No. 5, Article 581, May 21, 2020, 31 pgs., doi: 10.3390/e22050581.

King et al., "CRC-Aided List Decoding of Convolutional and Polar Codes for Short Messages in 5G", arXiv:2201.07843v1 [cs.IT], Jan. 19, 2022, 6 pgs.

King et al., "Design, Performance, and Complexity of CRC-Aided List Decoding of Convolutional and Polar Codes for Short Messages", arXiv:2302.07513v1 [cs.IT], Feb. 15, 2023, 9 pgs.

Kschischang et al., "Optimal Nonuniform Signaling for Gaussian Channels", EEE Transactions on Information Theory, vol. 39, No. 3, May 1993, pp. 913-929, doi: 10.1109/18.256499.

Laroia et al., "On Optimal Shaping of Multidimensional Constellations", IEEE Transactions on Information Theory, vol. 40, No. 4, Jul. 1994, pp. 1044-1056, doi: 10.1109/18.335969.

Liang et al., "List-Decoded Tail-Biting Convolutional Codes with Distance-Spectrum Optimal CRCS for 5G", IEEE Global Communications Conference (GLOBECOM), 2019, pp. 1-6, doi: 10.1109/GLOBECOM38437.2019.9013767.

Lou et al., "Convolutional-Code-Specific CRC Code Design", IEEE Transactions on Communications, vol. 63, No. 10, Oct. 2015, pp. 3459-3470, doi: 10.1109/TCOMM.2015.2459058.

Pikus et al., "Arithmetic Coding Based Multi-Composition Codes for Bit-Level Distribution Matching", IEEE Wireless Communications and Networking Conference (WCNC), 2019, pp. 1-6, doi: 10.1109/WCNC.2019.8885538.

Polyanskiy et al., "Channel Coding Rate in the Finite Blocklength Regime", IEEE Transactions on Information Theory, vol. 56, No. 5, May 2010, pp. 2307-2359, doi: 10.1109/TIT.2010.2043769.

Richardson et al., "The Capacity of Low Density Parity-Check Codes Under Message-Passing Decoding", IEEE Transactions on Information Theory, vol. 47, No. 2, Feb. 2001, pp. 599-618, doi: 10.1109/18.910577.

Runge et al., "Improved List Decoding for Polar-Coded Probabilistic Shaping", arXiv:2305.07962v3 [cs.IT], Oct. 5, 2023, 5 pgs.

Runge et al., "Multilevel Binary Polar-Coded Modulation Achieving the Capacity of Asymmetric Channels", arXiv:2202.04010v3 [cs.IT] Jun. 13, 2022, 6 pgs.

Schulte, "Algorithms for Distribution Matching", Ph.D. dissertation, Technische Universität München, May 2020, 133 pgs.

Schulte et al., "Constant Composition Distribution Matching", IEEE Transactions on Information Theory, vol. 62, No. 1, Jan. 2016, pp. 430-434, doi: 10.1109/TIT.2015.2499181.

Schulte et al., "Divergence-Optimal Fixed-to-Fixed Length Distribution Matching With Shell Mapping", IEEE Wireless Communications Letters, vol. 8, No. 2, Apr. 2019, pp. 620-623, doi: 10.1109/LWC.2018.2890595.

Seshadri et al., "List Viterbi Decoding Algorithms with Applications", IEEE transactions on communications, vol. 42, No. 2/3/4, 1994, pp. 313-323, doi: 10.1109/TCOMM.1994.577040.

Shannon, "Probability of Error for Optimal Codes in a Gaussian Channel'", Bell System Technical Journal, vol. 38, No. 3, May 1959, pp. 611-656, doi: 10.1002/j.1538-7305.1959.tb03905.x.

Shao et al., "Two Decoding Algorithms for Tailbiting Codes", IEEE Transactions on Communications, vol. 51, No. 10, Oct. 2003, pp. 1658-1665, doi: 10.1109/TCOMM.2003.818084.

Soong et al., "A fast tree-trellis search for finding the N-best sentence hypotheses in continuous speech recognition", Journal of the Acoustical Society of America, vol. 87, No. S1, 1990, pp. S105-S106, doi: 10.1121/1.2027805.

Tal, "List Decoding of Polar Codes", IEEE Transactions on Information Theory, vol. 61, No. 5, May 2015, pp. 2213-2226, doi: 10.1109/TIT.2015.2410251.

Ungerboeck et al., "Channel Coding with Multilevel/Phase Signals", IEEE Transactions on Information Theory, vol. 28, No. 1, Jan. 1982, pp. 55-67, doi: 10.1109/TIT.1982.1056454.

Vazquez-Vilar, "Error Probability Bounds for Gaussian Channels Under Maximal and Average Power Constraints", IEEE Transactions on Information Theory, vol. 67, No. 6, Jun. 2021, pp. 3965-3985, doi: 10.1109/TIT.2021.3063311.

Viterbi, "Convolutional Codes and Their Performance in Communication Systems", IEEE Transactions on Communication Technology, vol. 19, No. 5, Oct. 1971, pp. 751-772, doi: 10.1109/TCOM.1971.1090700.

Wang et al., "Achieving Short-Blocklength RCU bound via CRC List Decoding of TCM with Probabilistic Shaping", arXiv, arXiv:2111.08756v1, Nov. 16, 2021, 6 pgs.

Wang et al., "Probabilistic Shaping for Trellis-Coded Modulation With CRC-Aided List Decoding", IEEE Transactions on Communications, vol. 71, No. 3, Mar. 2023, pp. 1271-1283, doi: 10.1109/TCOMM.2023.3237263.

Weiß et al., "Code Construction and Decoding of Parallel Concatenated Tail-Biting Codes", IEEE Transactions on Information Theory, vol. 47, No. 1, Jan. 2001, pp. 366-386, doi: 10.1109/18.904537.

(56) References Cited

OTHER PUBLICATIONS

Wesel et al., "Reduced-State Representations for Trellis Codes Using Constellation Symmetry", IEEE Transactions on Communications, vol. 52, No. 8, Aug. 2004, pp. 1302-1310, doi: 10.1109/TCOMM.2004.833023.

Wiegart et al., "Probabilistically Shaped 4-PAM for Short-Reach IM/DD Links with a Peak Power Constraint", Journal of Lightwave Technology, vol. 39, No. 2, Jan. 15, 2021, pp. 400-405, doi: 10.1109/JLT.2020.3029371.

Wiegart et al., "Shaped On-Off Keying Using Polar Codes", IEEE Communications Letters, vol. 23, No. 11, Nov. 2019, pp. 1922-1926, doi: 10.1109/LCOMM.2019.2930511.

Xiao et al., "Finite-Support Capacity-Approaching Distributions for AWGN Channels", IEEE Information Theory Workshop, 2021, 6 pgs., doi: 10.1109/ITW46852.2021.9457608.

Yang et al., "A List-Decoding Approach to Low-Complexity Soft Maximum-Likelihood Decoding of Cyclic Codes", 2019 IEEE Global Communications Conference (GLOBECOM), 2019, pp. 1-6, doi: 10.1109/GLOBECOM38437.2019.9014092.

Yang et al., "An Efficient Algorithm for Designing Optimal CRCs for Tail-Biting Convolutional Codes", IEEE International Symposium on Information Theory (ISIT), 2020, pp. 292-297, doi: 10.1109/ISIT44484.2020.9174422.

Yang et al., "CRC-Aided List Decoding of Convolutional Codes in the Short Blocklength Regime", IEEE Transactions on Information Theory, vol. 68, No. 6, Feb. 2022, 23 pgs., doi: 10.1109/TIT.2022.3150717.

Yang et al., "Serial List Viterbi Decoding with CRC: Managing Errors, Erasures, and Complexity", IEEE Global Communications Conference (GLOBECOM), 2018, pp. 1-6, doi: 10.1109/GLOCOM.2018.8647589.

\* cited by examiner

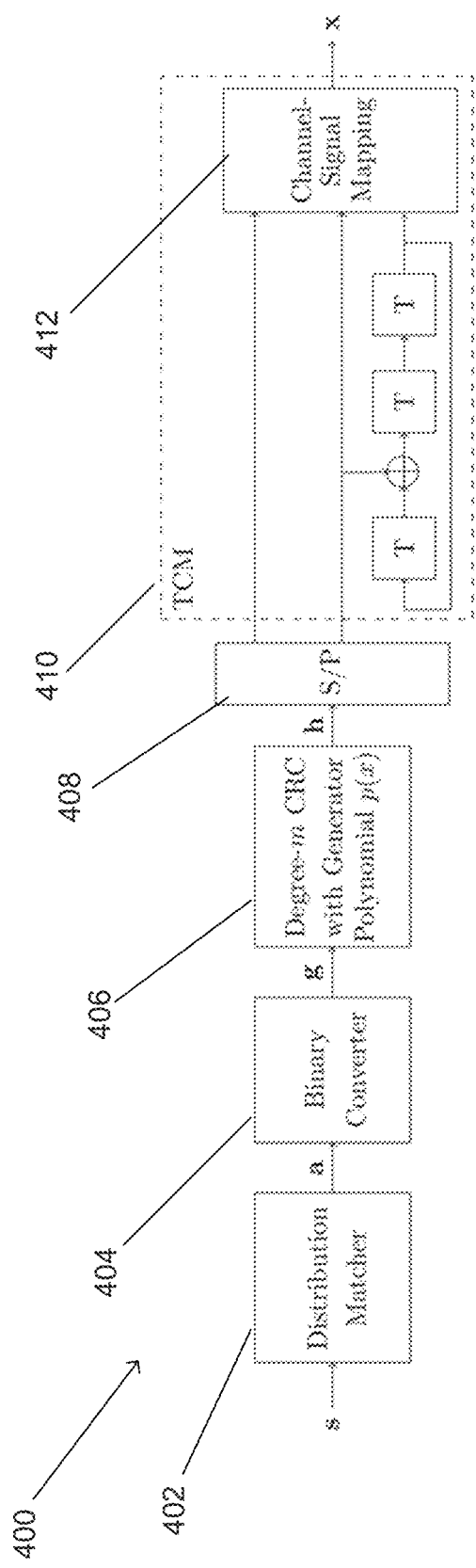
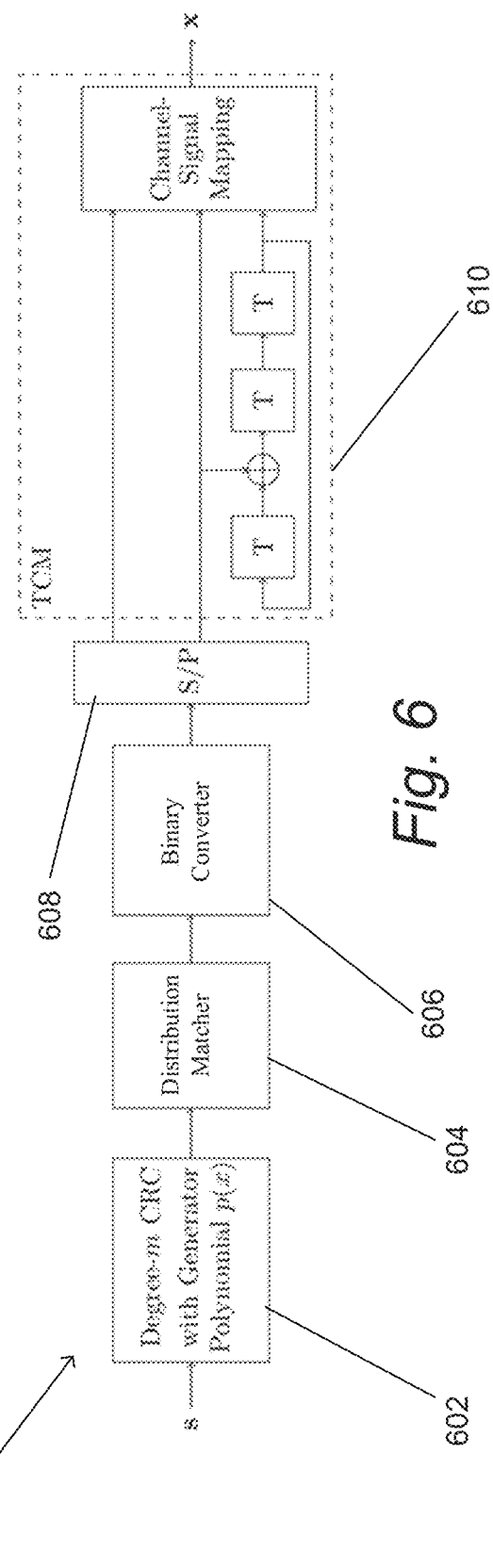
Fig. 4
Fig. 6

SYSTEMS AND METHODS FOR COMMUNICATING USING SHORT MESSAGES

CROSS-REFERENCE TO RELATED APPLICATIONS

The current application claims priority to U.S. Provisional Patent Application No. 63/421,213, filed Nov. 1, 2022, the disclosure of which is incorporated herein by reference in its entirety.

STATEMENT OF FEDERALLY SPONSORED RESEARCH

This invention was made with government support under Grant Number 1911166 and 2008918, awarded by the National Science Foundation. The government has certain rights in the invention.

FIELD OF THE INVENTION

The present invention relates generally to digital communications and more specifically to digital communications involve transmission of short-block-length messages.

BACKGROUND

Digital communication systems are utilized to transfer data over a communication channel, such as (but not limited to) an optical, wired, and/or wireless communication channel. The Shannon-Hartley theorem enables a determination of the maximum rate at which information can be transmitted over a communication channel of a specified bandwidth in the presence of noise. The theorem establishes Shannon's channel capacity for such a communication link, which is a bound on the maximum amount of substantially error-free information per time unit that can be transmitted with a specified bandwidth in the presence of noise, assuming that the signal power is bounded (i.e. the maximum capacity of the channel at a given signal-to-noise (SNR) ratio).

FEC or channel coding is a technique that can be used for controlling errors in data transmission over unreliable or noisy channels. Shannon's theorem predicts the maximum possible efficiency that can be achieved by a Forward Error Correction (FEC) code, but does not provide any insights into how to design such a code. Accordingly, coding theorists have attempted to develop FECs that can achieve efficiency approaching the Shannon limit.

Block codes are a category of FEC that work on a fixed-size number of bits or symbols. Practical block codes can generally be hard-decoded in polynomial time based upon block-length. Convolutional codes are a type of FEC that typically work on bit or symbol streams, which can be of arbitrary length, and are often soft decoded using an algorithm such as (but not limited to) the Viterbi algorithm. A convolutional code that is terminated can be considered to be a block code in that it encodes a fixed size block of input data, but the block size of a convolutional code is generally arbitrary. Types of termination for convolutional codes include "tail-biting" and "zero-state termination".

Convolutional codes inspired a joint modulation and coding technique known as Trellis Coded Modulation (TCM). TCM was developed by Gottfried Ungerboeck at IBM during the 1970s and involved the use of a convolutional code of rate (k, k+1). Additionally, Ungerboeck used mapping by set partitioning to allow some message bits to connect directly to the signal mapper without being part of the convolutional codes. With the advent of capacity-approaching codes (i.e. codes that are capable of achieving performance that is very close to the Shannon limit) in the 1990s, the use of TCM has declined in favor of coding and modulation schemes that more closely approach capacity and can achieve significantly higher data rates. Many current coding and modulation schemes use techniques, such as (but not limited to) Bit Interleaved Coded Modulation (BICM), to separate the encoding and modulation functions of the transmitter.

During the 1990s a number of different classes of capacity-approaching codes were discovered, or in the case of (Low Density Parity Check) LDPC codes rediscovered. The use of large block-length capacity-approaching codes significantly increased data rates that could be achieved within digital communication systems. Modern linear block codes, such as LDPC and Polar codes, are considered to be one class of "capacity-approaching" codes. A distinction is often drawn between classical or algebraic block codes (e.g. BCH, Golay, Hamming, Reed-Solomon codes) that apply the algebraic properties of finite fields and modern linear block codes, such as (but not limited to) LDPC and Polar codes, which are characterized by bipartite graphs. Turbo codes constitute a second class of capacity-approaching code that are based upon concatenated convolutional codes. Turbo coding is typically considered to involve an iterated soft-decoding scheme and a FEC that combines two or more relatively simple convolutional codes and an interleaver to produce a block code that can achieve performance approaching the Shannon limit. The first Turbo codes were parallel concatenated convolution codes and subsequent Turbo codes have also utilized serial concatenated convolutional codes.

SUMMARY OF THE INVENTION

Communication systems and methods in accordance with various embodiments of the invention transmit short block-length messages. The length of a short block-length message is typically dependent upon the requirements of specific applications and can include (but is not limited to) messages with 2000 or fewer message bits, messages with 1000 or fewer message bits, messages with 500 or fewer message bits, messages with 250 or fewer message bits, messages with 192 or fewer message bits, messages with 100 or fewer message bits, messages with 80 or fewer message bits, messages with 50 or fewer message bits, and/or messages with 33 or fewer message bits. In many embodiments, the communication systems can achieve communication rates exceeding Polyanskiy's Random Coding Union (RCU) bound and approaching the Shannon '59 sphere packing bound (Shannon '59 SP bound) with messages that have short block-lengths.

A transmitter in accordance with one embodiment of the invention includes:
  (a) an encoder configured to utilize a distribution matcher, an error detection encoder, and a trellis-coded-modulation encoder to process an input binary sequence of message bits to produce an output sequence of modulation symbols;
  (b) wherein the distribution matcher is configured to take as input a binary sequence and produce as output a sequence of symbols, where said sequence of symbols produced by the distribution matcher belongs to a distribution matcher codebook and wherein the distribution matcher codebook produces output symbols that approximate a finite-support probability mass function;

(c) wherein the error detection encoder is configured to take an input binary sequence and produce an error detection codeword based on an error detection code polynomial, where said error detection codeword is a longer binary sequence than the input binary sequence;

(d) wherein the trellis-coded-modulation encoder comprises: (i) a convolutional encoder configured to encode a binary input sequence to produce a convolution encoder output sequence; and (ii) a signal mapper configured to produce modulation symbols responsive to the convolutional encoder output sequence; and (e) wherein an input to the trellis-coded modulation encoder is the result of processing by both the distribution matcher and the error detection encoder.

In a further embodiment, the input binary sequence of message bits is the binary sequence taken as an input by the distribution matcher, a binary representation of the sequence produced by the distribution matcher is taken as the input binary sequence of the error detection encoder, and the binary input sequence of the convolutional encoder is obtained from the error detection codeword.

In another embodiment, the input binary sequence of message bits is the binary sequence taken as an input by the error detection encoder, the error detection codeword is taken as the input binary sequence of the distribution matcher, and the binary input sequence of the convolutional encoder is a binary representation of said sequence of symbols produced by the distribution matcher.

In a still further embodiment, the distribution matcher is a shell mapping distribution matcher.

In still another embodiment, the distribution matcher is a constant composition distribution matcher.

In a yet further embodiment, the distribution matcher is a multi-composition distribution matcher.

In yet another embodiment, the trellis coded modulation encoder is characterized in that the convolutional code is optimized for a performance metric based upon the finite support probability mass function of the distribution matcher.

In a further embodiment again, the performance metric is a union bound on frame error rate at one or more specified signal-to-noise ratios.

In another embodiment again, the trellis coded modulation encoder is characterized in that the convolutional code is optimized to maximize minimum distance between two codewords of a code produced by concatenating the polynomial of the error detection encoder and the convolutional encoder polynomial.

In a further additional embodiment, the distribution matcher codebook is selected so that the modulation symbols at the output of the trellis-coded-modulation encoder approximate a mutual-information optimized finite-support probability mass function.

In another additional embodiment, the error detection encoder is characterized in that the polynomial of the error detection encoder is optimized for a performance metric based upon the implementations of the distribution matcher, and the convolutional encoder.

In a still yet further embodiment, the performance metric is the union bound on frame error rate at one or more specified signal-to-noise ratios.

In still yet another embodiment, the performance metric is the minimum distance of the code produced by concatenating the polynomial of the error detection encoder and a convolutional encoder polynomial.

In a still further embodiment again, the convolutional encoder is an encoder for a tail-biting convolutional code.

In still another embodiment again, the convolutional encoder enforces a constraint that a codeword terminates in a zero state.

A method of receiving in accordance with an embodiment of the invention includes:

(a) receiving a signal;

(b) identifying a list of likely Trellis Coded Modulation (TCM) codewords based upon the received signal using a list decoder;

(c) selecting, from said list of likely trellis coded modulation codewords, a most likely codeword corresponding to an input to a TCM encoder that is consistent with an error detection encoder codebook and a distribution-matcher encoder codebook, where the receiver is configured to receive signals generated using the error detection encoder codebook, and the distribution matcher encoder codebook; and (d) identifying a k-bit message based upon the distribution matcher encoder codebook using a distribution matcher inverter; and (e) outputting the k-bit message.

In a further embodiment, the list decoder is a serial list decoder.

In another embodiment, the list decoder is a parallel list decoder.

In a yet further embodiment, the most likely convolutional codeword is a tail-biting convolutional codeword.

In yet another embodiment, identifying a list of likely trellis coded modulation codewords based upon the received signal using the list decoder further comprises utilizing a wrap-around Viterbi process to initialize trellis states.

In a further embodiment again, identifying a list of likely trellis coded modulation codewords based upon the received signal using the list decoder further comprises performing automorphism enabled decoding.

In another embodiment again, a codeword corresponding to an input to a TCM encoder is a convolutional codeword that terminates in a zero state.

A transmitter in accordance with another embodiment of the invention includes: a Probabilistic Amplitude Shaping (PAS) and error detection encoder configured to receive an input sequence of bits and output an amplitude shaped sequence incorporating error detection information, where the PAS is performed by a Distribution Matcher (DM) and the error detection information is based upon an error detection polynomial; a Forward Error Correction encoder configured to receive a binary representation of the amplitude shaped sequence incorporating error detection information and to output an encoded sequence, where the encoded sequence is encoded based upon a Convolutional Code (CC); and a modulator configured to map the encoded sequence to symbols and modulate the symbols for transmission.

In a further embodiment, the transmitter is characterized in that the error detection polynomial and the CC are optimized with respect to a bound on Frame Error Rate performance so that the transmitter is capable of transmitting data with a frame error rate that is below Polyanskiy's Random Coding Union (RCU) bound.

In a still further embodiment, the PAS and error detection encoder further comprises a binary converter and a polynomial error detection encoder.

In still another embodiment, the DM is configured to receive the input sequence of bits and produce a sequence of symbols from a distribution matcher codebook; the binary converter is configured to receive the sequence of symbols and produce a binary sequence based upon the sequence of symbols; and the polynomial error detection encoder is configured to receive the binary sequence produced by the binary converter and output the amplitude shaped sequence incorporating the error detection information based upon the error detection polynomial.

In a yet further embodiment, the polynomial error detection encoder is configured to receive the input sequence of bits and output a sequence of bits incorporating error detection information based upon the error detection polynomial; the DM is configured to receive the sequence of bits incorporating error detection information and produce a sequence of amplitude shaped symbols from a distribution matcher codebook; and the binary converter is configured to receive a sequence of amplitude shaped symbols produced by the distribution matcher and produce a binary representation of the amplitude shaped sequence for use by the Forward Error Correction encoder.

In yet another embodiment, the DM is a Multi-Composition Distribution Matcher.

In a further embodiment again, the transmitter is configured to utilize the PAS and error detection encoder, the FEC encoder, and the modulator to transmit short block-length messages. In addition, the transmitter further includes: a long block-length message encoder capable of encoding long block-length messages using a capacity approaching code, where the capacity approaching code is selected from the group consisting of Low Density Parity Check codes, Polar codes, and Turbo codes; a long block-length message mapper configured to map bits encoded using the capacity approaching code to symbols in a symbol constellation; and a long block-length message modulator configured to modulate symbols received from the long block-length message mapper for transmission. Furthermore, the transmitter is capable of switching between: a first configuration in which the PAS and error detection encoder, the FEC encoder, and the modulator are configured to transmit short block-length messages; and a second configuration in which the long block-length message encoder, the long block-length message mapper, and the long block-length message modulator are configured to transmit long block-length messages.

A receiver in accordance with an embodiment of the invention includes: a demodulator configured to receive a transmitted signal and output a demodulated signal; a demapper configured to determine symbol metrics from the demodulated signal; and a decoder configured to receive the symbol metrics and decode a sequence of received bits. In addition, the decoder is configured to decode the sequence of received bits by: performing List Viterbi Decoding based upon the symbol metrics to produce a list of likely Trellis Coded Modulation (TCM) codewords based upon a Convolutional Code (CC); selecting a most likely dataword from the list of likely TCM codewords such that the selected dataword is consistent with an error detection encoder codebook and a Distribution Matcher (DM) encoder codebook, where the receiver is configured to receive signals generated using the error detection encoder codebook, and the DM encoder codebook; performing Distribution Matcher (DM) decoding on the most likely dataword based upon the DM codebook to obtain the sequence of received bits; and output the sequence of received bits.

In a further embodiment, the receiver is characterized in that an error detection encoder polynomial and the CC are optimized with respect to a bound on Frame Error Rate performance so that the receiver is capable of receiving data at a specific Signal to Noise Ratio (SNR) with a frame error rate below Polyanskiy's Random Coding Union (RCU) bound.

In another embodiment, the DM is a Multi-Composition Distribution Matcher.

In a still further embodiment, the receiver is configured to utilize the demodulator, the demapper and the decoder to receive short block-length messages. In addition, the receiver further includes: a long block-length message demodulator configured to receive a transmitted long-block length message signal and output a demodulated long block-length message signal; a long block-length message demapper configured to determine likelihoods based upon the demodulated long block-length message using a symbol constellation; and a long block-length message decoder capable of to providing a sequence of received long block-length message bits based upon likelihoods determined by the long block-length demapper using a capacity approaching code, where the capacity approaching code is selected from the group consisting of Low Density Parity Check codes, Polar codes, and Turbo codes. Furthermore, the receiver is capable of switching between: a first configuration in which the demodulator, the demapper, and the decoder are configured for receiving short block-length messages; and a second configuration in which the long block-length message demodulator, the long block-length message demapper, and the long block-length message decoder are configured for receiving long block-length messages.

BRIEF DESCRIPTION OF THE DRAWINGS

The description will be more fully understood with reference to the following figures, which are presented as exemplary embodiments of the invention and should not be construed as a complete recitation of the scope of the invention. It should be noted that the patent or application file contains at least one drawing executed in color. Copies of this patent or patent application publication with color drawing(s) will be provided by the Office upon request and payment of the necessary fee.

FIG. 4 illustrates a transmitter capable of transmitting short messages encoded in accordance with various embodiments.

FIG. 6 illustrates a transmitter capable of transmitting short messages generated by encoding received data bits using a CRC code and then applying PAS using a DM to the CRC codewords in accordance with various embodiments of the invention.

DETAILED DESCRIPTION

Turning now to the drawings, communication systems and methods that transmit short block-length messages in accordance with various embodiments of the invention are illustrated. While capacity-approaching codes, such as (but not limited to) Low Density Parity Check (LDPC) codes, Turbo codes, and Polar codes, can achieve data rates approaching the Shannon limit at large block-lengths, the performance of these codes can deteriorate dramatically at short block-lengths. In a number of embodiments, transmitters and receivers use encoding and modulation techniques that are specifically designed for use with messages having short block-lengths. These messages can be referred to as short messages. In many instances, communication systems can use transmitters and receivers implemented in accordance with various embodiments of the invention to achieve communication rates exceeding Polyanskiy's Random Coding Union (RCU) bound and approaching the Shannon '59 sphere packing bound (Shannon '59 SP bound) with messages that have short block-lengths.

In several embodiments, message bits are transmitted using a Trellis Coded Modulation (TCM) system in which message bits that have been previously encoded by an error detection code, such as (but not limited to) a Cyclic Redundancy Check (CRC) code, are encoded using a convolutional code (CC). Error detection codes can be used to encode messages of a fixed block-length by adding a fixed-length check value, which can be utilized in subsequent error detection. As is discussed further below, the addition of a small number of bits generated using an error detection code can be utilized by decoders implemented in accordance with a number of embodiments of the invention to improve the decoding performance of the TCM system as opposed to being limited to an error detection role.

Figure 14:
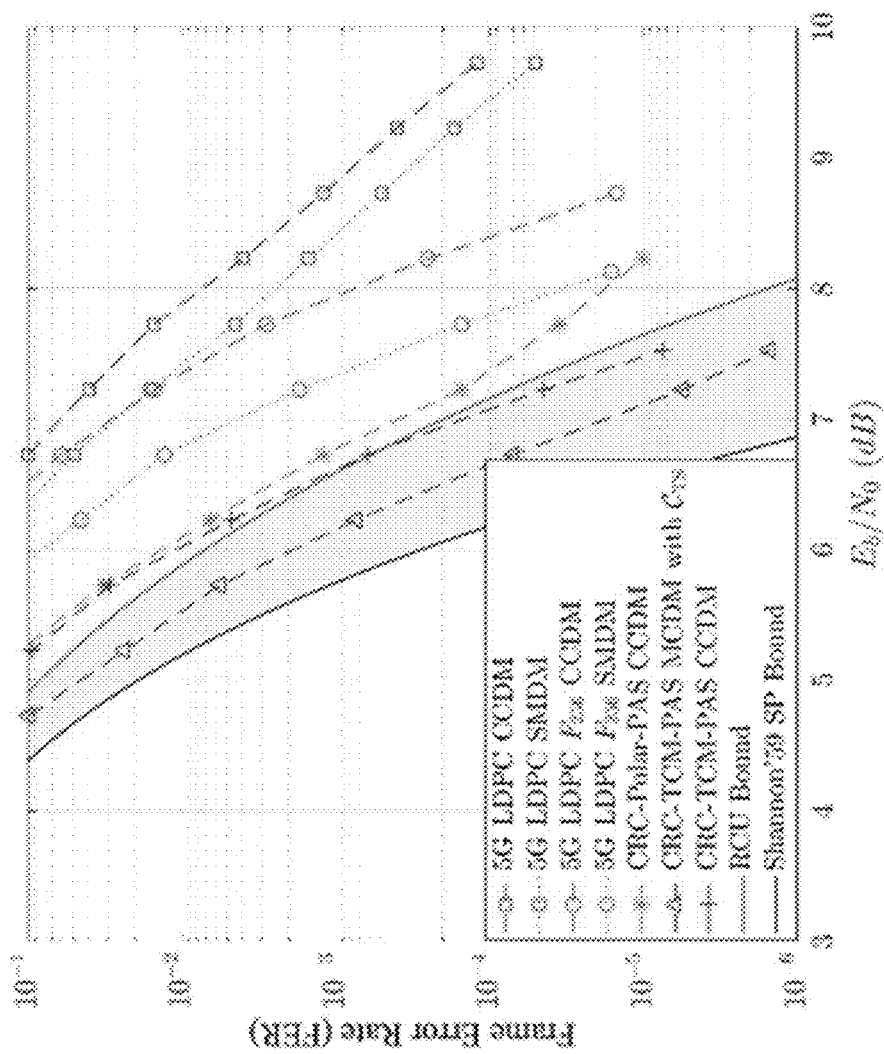
FIG. 14 shows a comparison of the decoding performance of communication systems implemented in accordance with various embodiments of the invention and other PAS systems that use various FEC codes.

In several embodiments, the communication system also employs probabilistic and/or geometric shaping. Claude Shannon predicted the potential for "shaping gains" within communication systems in the 1940s. Shannon speculated that a communication system that was capable of transmitting symbols with different probabilities (i.e. non-equiprobable symbols) could achieve increased performance compared to a communication system in which each symbol was equally probable. Practical communication systems typically utilize equiprobable signaling. Barsoum, Jones and Fitz, in the paper Barsoum, M. F., Jones, C. and Fitz, M., 2007, June. Constellation design via capacity maximization. In 2007 *IEEE International Symposium on Information Theory* (pp. 1821-1825). IEEE, showed that practical "shaping gains" could be achieved through geometric shaping (i.e. the design of a modulation scheme in which the symbols are non-uniformly spaced) in communication systems that utilize long block-length capacity-approaching codes. More recently, systems that employ Probabilistic Amplitude Shaping (PAS) have been demonstrated. Systems that employ PAS in optical communication systems employing LDPC codes using a Distribution Matcher (DM) are described in Buchali, F., Steiner, F., Böcherer, G., Schmalen, L., Schulte, P. and Idler, W., 2015. Rate adaptation and reach increase by probabilistically shaped 64-QAM: An experimental demonstration. *Journal of lightwave technology*, 34(7), pp. 1599-1609. Application of PAS in applications involving short block-length messages is described in Coşkun, M. C., Durisi, G., Jerkovits, T., Liva, G., Ryan, W., Stein, B. and Steiner, F., 2019. Efficient error-correcting codes in the short block-length regime. *Physical Communication*, 34, pp. 66-79. Coskun et al. review a variety of FECs that have historically been utilized to design block codes for short information blocks (e.g., a thousand or less information bits) including classical short codes and modern short codes. Despite studying the performance of classical short codes including classic codes involving concatenation of a CRC error-detection code with a punctured tailbiting CC, the authors instead propose utilizing PAS in combination with modern codes. The combinations proposed by Coskun et al. that utilize PAS involve the use of LDPC or Polar codes (i.e. modern codes). None of the proposed combinations involving modern codes achieves performance exceeding Polyanskiy's RCU bound. The combination proposed by Coskun et al. that most closely approaches Polyanskiy's RCU bound involves utilizing PAS in combination with a concatenation of a CRC error-detection code and a Polar code (CRC-Polar-PAS). As is discussed further below, systems and methods in accordance with various embodiments of the invention use PAS in combination with classical codes (e.g. classical Trellis Coded Modulation) to achieve performance exceeding Polyanskiy's RCU bound. A comparison of the performance of the CRC-Polar-PAS system described by Coskun et al. and the performance of a number of communication systems implemented in accordance with various embodiments of the system is illustrated in FIG. 14, which is discussed further below.

In many embodiments, the communication system utilizes a transmitter that employs a DM to perform probabilistic shaping in combination with a TCM system, where message bits that have been previously encoded by an error detection code are encoded using a convolutional code (CC). In many embodiments, the TCM system can also employ geometric shaping. As can readily be appreciated, the extent to which a communication system implemented in accordance with various embodiments of the invention employs probabilistic and/or geometric shaping is largely dependent upon the requirements of specific applications.

In a number of embodiments, the communication system includes a receiver that performs maximum likelihood (ML) decoding. In several embodiments, the receiver performs ML decoding using a serial list Viterbi decoder (S-LVD) that sequentially the most likely codewords in order of their likelihood. With a concatenated error detection code, the S-LVD finds the most likely codeword and performs an error detection check. If the codeword passes the error detection check, then the S-LVD has identified a valid codeword and can stop. Otherwise, the S-LVD can find the second most likely codeword and passes it through an error detection check. The decoding process can be repeated either until the error detection check succeeds or a specified number of codewords identified as likely by the S-LVD are found. While S-LVDs are utilized in many embodiments, receivers in accordance with several embodiments of the invention utilize alternative decoder implementations appropriate to the requirements of specific applications including (but not limited to) ML decoders. One example of an alternative implementation is the parallel list Viterbi decoder P-LVD. As can readily be appreciated, the specific decoder implementation that is utilized is largely dependent upon the requirements of a given application.

In many embodiments, the transmitter utilizes a DM to apply probabilistic amplitude shaping (PAS) to an error-detection-code-aided tail-biting TCM. In several embodiments, the code utilized to perform the TCM is a rate $$\frac{k}{k+1}$$

tail-biting convolutional code (TBCC). Through the use of mapping by set partitioning, the TCM can be performed using a channel-signal mapping function that takes as inputs bits that are part of the CC and bits that are not part of the CC. In the transmitter, equally likely message bits are encoded by the DM, which generates amplitude symbols with a desired distribution. The transmitter can append bits generated using an error detection code to the sequence of binary encoded amplitude symbols, and this error detection codeword can then be encoded and modulated by TCM to produce real-valued channel input signals. In this way, the transmitter can generate channel input symbols with a symmetric capacity-approaching probability mass function.

In many embodiments, an analytical upper bound on the frame error rate of the communication system, can be used as an objective function for jointly optimizing both a polynomial that forms the basis of the error detection code and a polynomial that forms the basis of the convolutional code. An important insight that can be utilized in performing the optimization is that the optimization can be performed with respect to an equivalent convolutional code having a polynomial defined as the product of the polynomials of the error detection code and convolutional codes. An error detection polynomial that is produced through the use of the optimization processes described herein may generate a linear cyclic code or may generate a linear code that is not cyclic. While much of the discussion that follows refers to error detection codes that are CRCs, it should be readily appreciated that CRCs are simply examples of appropriate error detection codes and that embodiments of the invention are not limited to the use of CRCs. The specific error detection code that is utilized is largely dependent upon the requirements of a particular application.

In a number of embodiments, the communication system utilizes a multi-composition distribution matcher (MCDM). A MCDM can be seen as a collection of constant composition distribution matchers (CCDMs). There are two major advantages to use of a CCDM. First, a CCDM can be asymptotically optimal. Second, a CCDM does not need to store its codebook offline, and arithmetic coding can be used to sequentially generate codewords for the CCDM. An MCDM, whose codebook can be seen as a union of multiple CCDM codebooks, is capable of efficiently storing codebook information in memory. The decoding process can also be straightforward. For any received symbol, the decoder can first check whether the symbol sequence is one of the types in the codebook of the MCDM. If so, the decoder can check whether the symbol sequence is in the codebook. If the symbol sequence is in the MCDM codebook, then the MCDM inverter can generate a corresponding output bit sequence. Otherwise, the decoder can declare that the symbol sequence is not valid. While MCDMs can offer many performance benefits, transmitters in accordance with many embodiments of the invention can utilize any of a variety of different types of distribution matcher appropriate to the requirements of specific applications including (but not limited to) shell-mapping (SM) DMs, CCDMs, and other forms of DM.

While many communication systems are described herein as utilizing amplitude modulation, it should be readily appreciated that the techniques described herein can be utilized with any TCM including (but not limited to) Phase Shift Keyed (PSK), Quadrature Amplitude Modulation (QAM), and Amplitude Phase Shift Keyed (APSK) modulation schemes as appropriate to the requirements of specific applications in accordance with various embodiments of the invention. Further, the various approaches to distribution matching can be applied to one dimensional symbols as in amplitude modulation, two dimensional symbols as in QAM, PSK, or APSK, or more than two dimensions as with, for example, four-dimensional or eight-dimensional symbols. In addition, the methods described herein can be utilized with any of a variety of different communication channels including communication channels having characteristics similar to an Additive White Gaussian Noise (AWGN) channel and/or fading channels. Communication systems and methods of transmitting and receiving data using short messages in accordance with various embodiments of the invention are discussed further below.

Communication Systems

Communication systems and methods in accordance with various embodiments of the invention can be utilized to efficiently transmit short messages. Short message transmission can be useful in a variety of circumstances including (but not limited to) control signaling in wireless communication networks, device-to-device communications (e.g. Near Field Communication (NFC), Bluetooth, vehicle-to-vehicle communications), and data transmissions by Internet of Things (IoT) devices. In many embodiments, transmission of data using higher order modulation schemes in the manner described herein can enable the transmission of data using fewer symbols compared to transmission of a larger number of lower cardinality symbols. In this way, data can be transmitted over a shorter time period. Furthermore, transmission of fewer symbols can enable extended battery life in battery powered devices.

Figure 1:
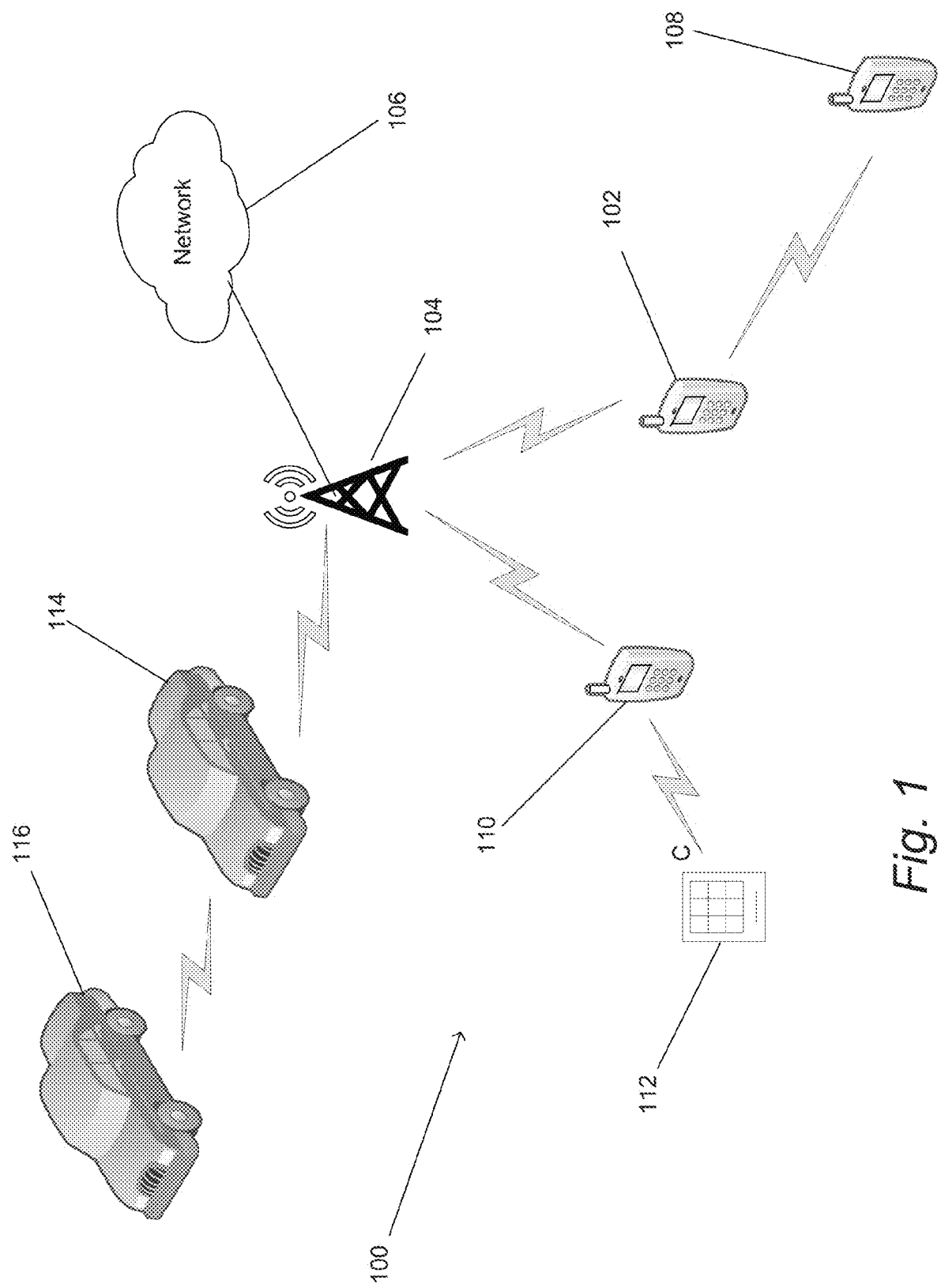
FIG. 1 illustrates a communication system that includes various devices that transmit short messages in accordance with various embodiment of the invention.

A communication system that includes various devices that transmit short messages in accordance with various embodiment of the invention is illustrated in FIG. 1. The communication system 100 includes a mobile phone 102 capable of communicating with a cell tower 104 that connects the mobile phone 102 to a network 106. In the illustrated embodiment, the sequence of message exchanges between the mobile phone 102 and the cell tower 104 includes the exchange of a number of short block-length messages encoded and decoded in accordance with various embodiments of the invention. In many instances, the short block-length messages are utilized by the mobile phone 102 to negotiate access to and/or transmission of data via the network 106. In several embodiments, the short block-length messages are utilized to communicate information via at least one of a Broadcast Control Channel, a Paging Control Channel, a Common Control Channel, and/or a Dedicated Control Channel. Sometimes these messages communicate transmission parameters. As can be readily appreciated, the specific circumstances and/or the particular channels utilized to transmit and receive short block-length messages encoded in accordance with various embodiments of the invention are largely dependent upon the requirements of specific applications.

In a number of embodiments, the mobile phone 102 and/or the cell tower 104 transmit short messages using a DM to apply PAS to short block-length messages modulated using error-detection-code-aided tail-biting TCM. The encoded information can then be used to perform TCM using a TBCC. In certain embodiments, short messages transmitted using this modulation scheme are decoded by the mobile phone 102 and/or the cell tower 104 using an LVD. As noted above, short messages transmitted and received in this manner can achieve efficiencies exceeding Polyanskiy's RCU bound.

Referring again to FIG. 1, the mobile phone 102 can also utilized short block-length messages encoded in accordance with various embodiments of the invention in short-range wireless communications with other devices such as, but not limited to, another mobile phone 108. Mobile phones can also use short block-length messages encoded in accordance with various embodiments of the invention to communicate via Near Field Communication (NFC). In the illustrated embodiment, a mobile phone 110 is shown communicating with a payment terminal 112.

Use of short messages encoded in accordance with various embodiments of the invention is not limited to mobile phones. Any of a variety of devices capable of wireless communication can encode and/or decode short messages using the techniques described herein. For example, FIG. 1 illustrates a vehicle 114 communicating with the cell phone tower 104 using short messages encoded in accordance with various embodiments of the invention. The vehicle 114 is also capable of utilizing short messages encoded in accordance with various embodiments of the invention to perform Vehicle-to-Vehicle (V2V) communication and/or Vehicle-to-Everything (V2X) communication. As can readily be appreciated, any of a variety of devices can use short block-length messages encoded in accordance with various embodiments of the invention to communicate via any of a number of wired and/or wireless communication techniques including (but not limited to) NFC, short-range wireless, wireless Local Area Network, and/or cellular data network as appropriate to the requirements of specific applications.

While specific communication systems and devices that communicate using short messages encoded in accordance with various embodiments of the invention are described above with reference to FIG. 1, any of variety of different communication systems and/or communication devices can be utilized to transmit short messages in accordance with certain embodiments of the invention. For example, communication systems in accordance with a number of embodiments of the invention can include medical devices, UAVs, and/or any other type of device that can communicate via a wired and/or wireless communication channel. Communication devices, and transmitters and receivers that can be utilized within communication devices implemented in accordance with various embodiments of the invention are discussed further below.

Communication Devices

Communication devices in accordance with many embodiments of the invention can incorporate one or more transmitters, one or more receivers and/or one or more transceivers that are capable of encoding and/or decoding short messages using the techniques described herein. In many embodiments, the techniques described herein can be utilized to efficiently exchange control information to negotiate the efficient transmission of longer block-length messages using conventional communication techniques such as (but not limited to) using LDPC and/or Polar codes with higher order modulation schemes including (but not limited to) higher order uniform QAMs and non-uniform capacity-optimized QAMs. In certain embodiments, the techniques described herein are used to transmit control and/or application data. As can readily be appreciated, the specific circumstances in which the efficient transmission of short messages is beneficial typically depends upon the requirements of particular applications.

Figure 2:
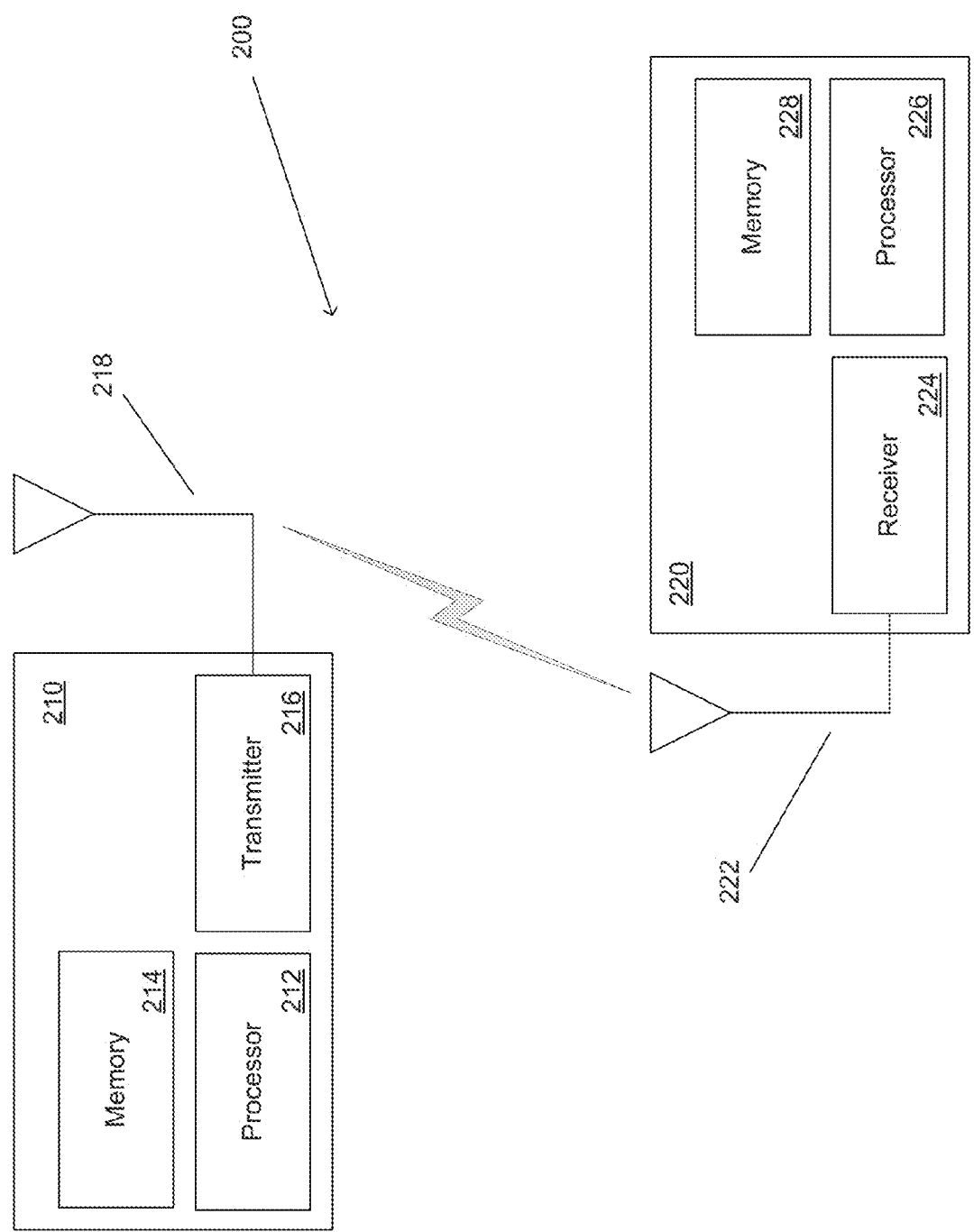
FIG. 2 illustrates a communication system capable of transmitting short messages encoded in accordance with various embodiments of the invention.

A communication system capable of transmitting short messages encoded in accordance with various embodiments of the invention is illustrated in FIG. 2. The communication system 200 includes a first communication device 210 that includes a processor 212, memory 214, a transmitter 216, and an antenna 218. While the illustrated embodiment shows the use of an antenna 218, it should readily be appreciated that the techniques described herein are equally applicable to wired communication systems including (but not limited to) optical communication systems.

In many embodiments, the processor 212 of the first communication device 210 executes one or more applications stored in memory 214 that cause the transmission of control and/or application data via the transmitter 216. The transmitter is capable of establishing a communication channel and transmitting the control and/or application data. In many instances, the transmitted message contains encoded control information utilized to establish a communication channel for communicating application data for the same application and/or other applications. In a number of embodiments, the process of establishing the communication channel involves the use of short messages encoded using the techniques described herein. In several embodiments, the techniques described herein are used to encode short block-lengths of application data for transmission via the communication channel. As can readily be appreciated, the techniques described herein can be utilized to encode some or all of the messages transmitted via the transmitter as appropriate to the requirements of specific applications.

A second communication device 220 receives messages transmitted by the first communication device 210 via an antenna 222. In the illustrated embodiment, the second communication device 220 includes a receiver 224, a processor 226, and memory 228. In many instances, the receiver receives transmitted messages and outputs application data that is processed by at least one application executing on the processor 226 using the machine-readable instructions of the at least one application stored in the memory 228. In many instances, the short messages received by the receiver are encoded in accordance with various embodiments of the invention. In certain embodiments, the short messages encoded in this manner are utilized to communicate control information. In a number of embodiments, the short messages encoded in this manner are utilized to transmit application data. As can readily be appreciated, the specific information transmitted via the short messages is largely dependent upon the requirements of specific applications.

In a number of embodiments, the transmitter uses a DM to apply PAS to short-block-length messages modulated using error-detection-code-aided tail-biting TCM. The encoded information can then be used to perform TCM using a TBCC. In certain embodiments, short messages transmitted using this modulation scheme are decoded at the receiver using an LVD. In several example embodiments, the input length of the short messages is 87 bits and the transmitter produces 65 to 67 8-amplitude-modulated (8-AM) coded output symbols. As can readily be appreciated, the specific number of input bits, number of output symbols, and/or modulation scheme that is utilized by the transmitter is largely dependent upon the requirements of specific applications. Furthermore, it should also be appreciated that the transmitter is capable of communicating via multiple coding and modulation schemes. In this way, the transmitter can efficiently encode short messages (where appropriate) and also utilize encoding and/or modulation techniques that are appropriate for the transmission of longer block-length messages.

While specific communication devices capable of communicating using short messages are described above with reference to FIG. 2, any of variety of different communication systems and/or communication devices can be utilized to transmit short messages via wired and/or wireless communication channels in accordance with various embodiments of the invention. Furthermore, any of the communication devices described with reference to FIG. 2 can be utilized in any of a variety of communication systems including (but not limited to) the communication systems described above with reference to FIG. 1. Specific processes for encoding short messages for transmission and decoding short messages in accordance with various embodiments of the invention are discussed further below.

Short Message Transceivers

Transceivers, transmitters and receivers capable of transmitting and/or receiving short messages encoded in accordance with various embodiments can be implemented in a variety of ways. The order of the DM and error detection encoder can be reversed and/or a variety of FECs and modulation schemes can be utilized as appropriate to the requirements of specific applications. In many embodiments, joint FEC encoding and modulation are performed using TCM based upon a TBCC. It should readily be appreciated, however, that alternative convolutional codes and/or modulation schemes can be utilized as appropriate to the requirements of specific applications.

Figure 3:
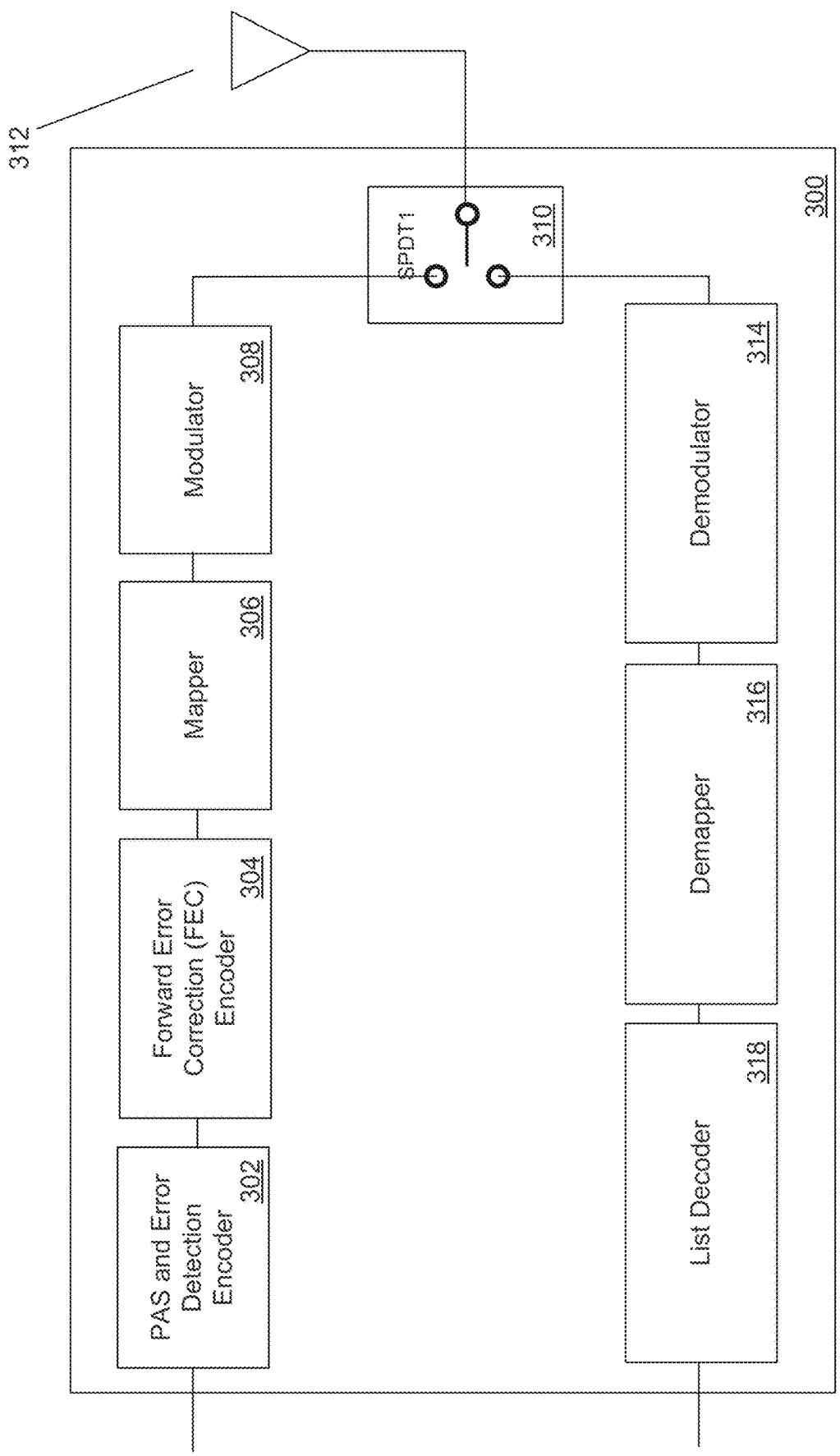
FIG. 3 illustrates a transceiver capable of transmitting and receiving short messages encoded in accordance with various embodiments of the invention.

A transceiver capable of transmitting and receiving short messages encoded in accordance with various embodiments of the invention is illustrated in FIG. 3. The transceiver 300 receives data bits and encodes the data bits using a combination of probabilistic amplitude shaping and addition of error detection bits in accordance with an error detection polynomial using a PAS and error detection encoder 302. In many embodiments, the PAS and error detection encoder 302 includes a DM, a binary converter, and an error detection encoder. As is discussed further below, the addition of check bits by an error detection encoder to obtain an error detection codeword can be performed before or after PAS by the DM. When PAS is applied to the data bits prior to the addition of the check bits, the error detection bits are equiprobable. When PAS is applied after the generation of check bits using the error detection code, then amplitude shaping is also applied to the check bits. Given the comparatively small number of check bits, limiting PAS to the user data bits typically does not significantly impact system performance compared to a system that applies PAS to all bits. As is discussed further below, the ability to access error detection code check bits without verifying consistency with the DM codebook can reduce the complexity of a decoder. Accordingly, transmitters in accordance with many embodiments of the invention perform PAS prior to generating check bits using error detection encoding.

The encoded bits output by the PAS and error detection encoder 302 are received by the Forward Error Correction (FEC) encoder 304. In many embodiments, the FEC encoder 304 encodes the received bits using one or more convolutional codes. As can be readily appreciated, the specific code that is utilized in the encoding of the received bits is largely dependent upon the requirements of specific applications.

The encoded bits output by the FEC encoder 304 are received by the mapper 306, which maps the encoded bits to symbols in accordance with a specific modulation scheme. Any of a variety of modulation schemes can be utilized including (but not limited to) Pulse Amplitude Modulation (PAM), Quadrature Amplitude Modulation (QAM), Phase Shift Keyed (PSK), and Amplitude Phase Shift Keyed (APSK) modulation schemes. In many embodiments, the FEC encoder 304 and mapper 306 perform a joint encoding and modulation such as (but not limited to) a Trellis Coded Modulation. Where the FEC encoder 304 and Mapper 306 form part of a TCM, mapping via set partitioning can enable one or more bits output by the PAS and error detection encoder 302 to be passed directly to the mapper 306 so that the bits are not part of the FEC. The symbols output put by the mapper 306 are provided to a modulator 308, which, for the application to wireless systems, generates an RF signal that can be transmitted via (310) one or more antennas 312.

The antenna 312 can also be connected (310) to a receiver signal path within the transceiver. The antenna 312 can provide a received RF signal to a demodulator 314, which can output a demodulated signal 314 to a demapper 316. The demapper can 316 can generate a sequence of symbol metrics that are provided to a decoder 318. In several embodiments, the symbol metrics can be log likelihood ratios with respect to each possible symbol. In a number of embodiments, the symbol metrics can be Euclidean distances with respect to each possible symbol. The specific choice of symbol metric of course depends on the particular application. In the illustrated embodiment, the decoder 318 is a list decoder that generates a list of the most likely sequences. In many embodiments, the list decoder uses the error detection code to verify that the check bits of the most likely decoded bit sequence pass an error detection check. When the most likely decoded bit sequence passes the error detection check, the sequence is checked to see if it is a valid DM output. If so, a received user data bit sequence is identified from the decoded bit sequence using the DM codebook, and the received data sequence is output by the receiver. In the event the most likely bit sequence identified by the list decoder 318 fails the error detection check or passes the error detection check but does not correspond to a valid DM output, the list decoder applies the error detection to check to each next most likely decoded bit sequence until a bit sequence is identified that passes the CRC check and produces a valid distribution matcher output. In many instances, the list decoder is a parallel list decoder that can produce a list of likely sequences that are processed in parallel to determine whether each of the likely sequences is consistent with the error detection encoder codebook and the DM codebook. As can readily be appreciated, the specific implementation of a list decoder used in a receiver implemented in accordance with various embodiments of the invention is largely dependent upon the requirements of specific applications.

While a variety of different transceiver implementations are described above with reference to FIG. 3, any of a variety of transmitter, receiver and/or transceiver architectures capable of transmitting and/or receiving short messages encoded in accordance with various embodiments of the invention can be utilized as appropriate to the requirements of specific application. Various transmitters that utilize different techniques for PAS and error detection encoding are discussed further below.

Transmitter Architectures

Transmitters in accordance with many embodiments of the invention can utilize a DM to apply PAS prior to the addition of check bits using an error detection encoder. Alternatively, the transmitter can append check bits to data bits using an error detection encoder and then apply PAS using a DM. The performance difference in terms of capacity is typically negligible as both approaches achieve the objective of applying PAS to the bit sequence to which FEC is applied. The comparatively small number of check bits does not materially impact the shaping gains achieved through probabilistic shaping. As discussed below, efficiencies can be achieved in the decoder when check bits are directly accessible to a list decoder. While specific examples are discussed below in which the error detection code is referred to as a CRC, it should be readily appreciated that the techniques described herein are not limited to the use of error detection codes that are cyclic. Accordingly, any error detection code appropriate to the requirements of a specific application may be utilized.

A transmitter capable of transmitting short messages encoded in accordance with various embodiments of the invention is illustrated in FIG. 4. In the illustrated embodiment, a length-k binary source sequence $s \in \mathbb{F}_2^k$ is received by the transmitter 400. The source sequence is encoded as a length-l symbol sequence a by a DM 402. The symbol sequences output by the DM 402 is converted to a binary representation by the binary converter 404. Then, the binary representation of a, $g \in \mathbb{F}_2^{k_0 l}$, is encoded by CRC encoder 406 using a systematic m-bit CRC with generator polynomial p(x). Finally, a serial to parallel converter 408 provides sets of bits from the output of the CRC encoder 406 to the TCM 410, which encodes some of the bits within the sets of bits using a CC that passes its output to a channel symbol mapper 412. The TCM 410 may also pass through other bits from the sets of bits that are not part of the CC to the channel symbol mapper 412. The channel symbol mapper 412 maps the received bits to a length-n channel input sequence $x \in X^n$, where X denotes the AM constellation set and $$n = l + \frac{m}{k_0}.$$

The system implicitly requires that $k_0$ divides by m. The transmission rate of the system 400 is k/n bits/real channel use. The TCM 410 includes a systematic, rate $$\frac{k_0 - 1}{k_0}$$

TBCC, and a channel-signal mapper 412 which maps each $k_0+1$ encoded bits onto one of $2^{k_0+1}$ symbols in the AM constellation set X. As can readily be appreciated, the Channel-Signal Mapper 412 can map encoded bits to any of a variety of one dimensional and/or multidimensional symbol constellations including (but not limited to) AM, QAM, PSK, and/or APSK constellations. In addition, the manner in which the symbols are mapped can take advantage of techniques including (but not limited to) Single Input Single Output (SISO), Single Input Multiple Output (SIMO) and Multiple Input Multiple Output (MIMO) transmitter and receiver configurations.

Figure 5:
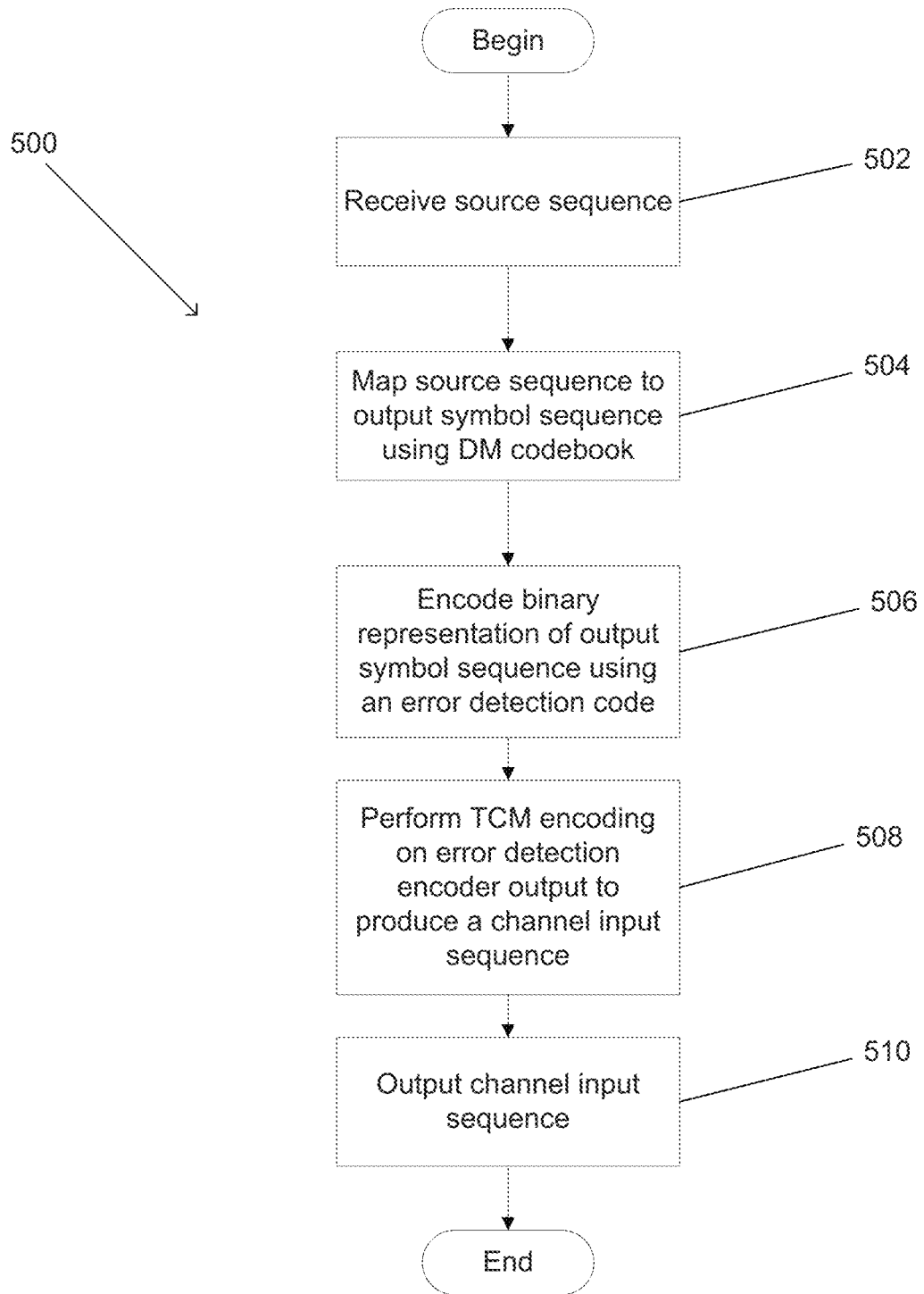
FIG. 5 illustrates a process for encoding and transmitting data bits in accordance with an embodiment of the invention.

Transmitters including (but not limited to) the various transmitters described above with reference to FIG. 4 are capable of employing a method of encoding and transmitting data bits in accordance with the method illustrated in FIG. 5. The method of transmitting data 500 includes receiving (502) a source sequence of data bits. The source sequence of data bits is mapped (504) to an output symbol sequence in accordance with a DM codebook. In many embodiments, the mapping applies PAM to the received sequence of data bits in accordance with one or more DM codebooks. In many embodiments, the DM codebook produces output symbols that approximate a finite-support probability mass function. In a number of embodiments, the finite-support probability mass function is selected by optimizing the probability mass function with respect to a measure of mutual information. In this way, the DM codebook produces symbols that approximate a mutual information optimized finite-support probability mass function. As can readily be appreciated, the specific manner in which the DM codebook is selected is largely dependent upon the requirements of specific applications.

An output symbol sequence can be converted to a binary representation and error detection encoded (506) to create an error detection codeword using techniques including (but not limited to) appending one or more check bits using an error detection code. As discussed further below, the number of check bits can be small. In many embodiments, two check bits are appended to the binary representation of the output symbol sequence. As can readily be appreciated, the specific number of check bits that are appended to the to the binary representation of the output symbol sequence is largely dependent upon the requirements of specific applications. Furthermore, error detection encoding can be applied directly to the sequence of received data bits prior to mapping (504) so that the symbol sequence selected in accordance with the at least one DM codebook is based upon both the received data bits and the appended check bits generated using the error detection code.

Referring again to the illustrated embodiment, TCM modulation is performed (508) on the error detection encoder output to map FEC encoded bits to a symbol sequence, which is then output (510) for transmission and transmitted.

While specific processes are described above with reference to FIG. 5, any of a variety of methods for transmitting sequences of received data bits as short messages can be utilized as appropriate to the requirements of specific applications in accordance with various embodiments of the invention.

As noted above, transmitters in accordance with many embodiments of the invention can perform error detection encoding prior to PAS. A transmitter capable of transmitting short messages generated by encoding received data bits using a CRC code and then applying PAS using a DM to the CRC codewords in accordance with various embodiments of the invention is illustrated in FIG. 6. The structure of the transmitter 600 differs from the structure of the transmitter 400 shown in FIG. 4 in the order of CRC encoder and the DM. For the structure of the transmitter 600 shown in FIG. 6, the information bits are first encoded by the CRC encoder 602, and the output of CRC encoder 602 is then mapped to the codeword of the DM 604. The symbol sequence output by the DM is converted to a binary representation by the binary converter 606 and sets of bits from the output of the binary converter 606 are provided to the TCM 610 by a serial to parallel converter 608. The TCM 610 generates a sequence of symbols that are modulated for transmission in a manner similar to that described above with respect to FIG. 4.

While specific transmitters and methods of transmitting user data as short messages encoded in accordance with various embodiments of the invention are described above with reference to FIGS. 3-6, it should be appreciated that any of a variety of transmitters and/or methods of transmission that employ a DM, a an error detection encoder and a TCM to efficiently encode received data bits can be utilized as appropriate to the requirements of specific applications in accordance with various embodiments of the invention. The DM, in particular, plays an important role in increasing efficiency in transmitters implemented in accordance with many embodiments of the invention. Various DMs that can be utilized to implement transmitters in accordance with certain embodiments of the invention are discussed further below.

Distribution Matchers

The use of DMs can provide significant performance gains within communication systems that communicate via short messages. Communication systems implemented in accordance with various embodiments of the invention employ a variety of different types of DMs. In several embodiments, the communication systems employ a fixed-to-fixed multi-composition distribution matcher.

A fixed-to-fixed distribution matcher utilizes an injective function $f$ DM that maps a binary length-k source sequence $s \in \mathbb{F}_2^k$ to a length-l symbol sequence $a \in \mathcal{A}^l$, i.e., $f_{DM}$: $\{0,1\}^k \to \mathcal{A}^l$. $\mathcal{A} = \{0, 1, \ldots, |\mathcal{A}|-1\}$ is the output symbol set. In many embodiments, $\log_2 |\mathcal{A}| = k_0$ is limited to be some integer. However, this limitation is not necessary. The range of $f_{DM}$ is the codebook of the DM, which can be denoted by $c_{DM}$. Because each length-k binary input sequence is distinctly mapped to an output sequence in $c_{DM}$, $|c_{DM}| = 2^k$. The empirical distribution of a DM with codebook $c_{DM}$ can be defined as $P(\overline{A})$.

The symbol sequence $\hat{A}^l$ can be considered a random vector that contains l independent identical distributed (i.i.d.) symbols with distribution $P(\hat{A})$. In addition, a can be considered to be a realization of $\hat{A}^l$, $P_{\hat{A}^l}(a) = \Pi_{i=1}^l P_{\hat{A}}(a_i)$. In several embodiments, the DM chooses $2^k$ length-l sequences with highest probability $P_{\hat{A}^l}(a)$. In many embodiments, the DM is optimal in terms of normalized KL divergence and can be referred to as a shell-mapping (SM) DM. An SMDM can be realized using enumerative coding or divide-conquer coding, however, the typical memory requirements for storing the codebook information often prevents use of an SMDM in large-block-length (i.e. large l) applications.

A constant composition DM (CCDM) is a DM in which the codebook, $c_{CCDM}$, contains sequences that have the same type, which is defined as follows:

Definition 1. The type (or empirical distribution) $P_a$ of a sequence $a=[a_0, a_1, \ldots, a_{l-1}]$ is the relative proportion of occurrence of each symbol in $\mathcal{A}$, i.e., $$P_a(i) = \frac{\sum_{j=0}^{l-1} \mathbb{1}(a_j = i)}{l},$$

$i \in \mathcal{A}$. Define the set of sequences of length l and type P as set class of P, denoted by $\mathcal{T}_P^l$:

$$\mathcal{T}_P^l = \{a \in \mathcal{A}^l : P_a = P\}. \qquad \text{Eq. 1}$$

Based on Definition 1, the codebook of a CCDM is a subset of a set class of some type P. The type P can be chosen such that $2^k \leq \mathcal{T}_P^l < 2^{k+1}$, and normalized KL divergence can be minimized. Because all codewords in $c_{CCDM}$ can have the same type P, the empirical distribution of CCDM P($\overline{A}$)=P. There are two major advantages for CCDM. First, the CCDM is asymptotically optimal. Second, Unlike SMDM, CCDM does not require that the codebook be stored offline, and arithmetic coding can be used to sequentially generate codewords in $c_{CCDM}$. However, the normalized KL-divergence of a CCDM can be large in the short-block-length regime.

As noted above, communication systems in accordance with many embodiments of the invention utilize a multi-composition distribution matcher (MCDM) whose codebook can be seen as a union of multiple CCDM codebooks. The codebook information for an MCDM can require less memory to store than the codebook information of an SMDM. The codebook of a MCDM, $c_{MCDM}$, has the following properties:

1. $c_{MCDM}$ is a union of $\tau$ disjoint children codebooks, i.e., $c_{MCDM} = \cup_{i=1}^\tau c_i$, and $c_i \cap c_j = \emptyset$, for $i \neq j$.
2. The codewords in each codebook have the same type, i.e.

$$C_i \subseteq \mathcal{T}_{P_{A_i}}^l, i = 1, 2, \ldots, \tau.$$

No two different children codebooks share the same type.

3. The cardinality of the $i^{th}$ children codebook is $$|C_i| = 2^{\left\lfloor \log_2\left(\mathcal{T}_{P_{A_i}}^l\right) \right\rfloor}, \text{ for } i = 1, 2, \ldots, \tau - 1,$$

$$\text{and } |C_\tau| = 2^k - \sum_{i=1}^{\tau-1} |C_i|.$$

Hence, the MCDM encoding consists of two steps: choose $c_i$ and perform arithmetic encoding with type $P_{A_i}$. Denote $b_i$ be the k-bit binary representation of $\sum_{m=0}^i |c_i|$, i=0, ..., $\tau$. Given an input s, the encoding process can be summarized as the following three steps:

1. Find type index i, where $b_{i-1} \leq s < b_i$.
2. Calculate CCDM input:

$$c = [s - b_{i-1}]_{\left\lfloor \log_2\left(\mathcal{T}_{P_{A_i}}^l\right) \right\rfloor}.$$

$[a]_n$ returns last n bits of a.

3. Perform CCDM encoding with type $P_{A_i}$ and input c, and generate an output sequence.

The MCDM decoding process can also be straightforward. For any $a \in \mathcal{A}^l$, the decoder can first check whether the type of a is one of the types in $c_{MCDM}$. If so, the decoder can perform arithmetic decoding to check whether a is in the codebook. Otherwise, the decoder declares that $a \notin c_{MCDM}$.

One critical problem of MCDM is the choice of children codebooks $c_i$, i=1, ..., $\tau$. Two rules can be utilized in the selection of children codebooks:

Rule 1: High-probability Rule:

$$P(A_i) = \underset{P(A^*)\in\mathcal{P}\setminus\{P(A_1),\ldots,P(A_{i-1})\}}{\operatorname{argmax}} \sum_{a=1}^{|\mathcal{A}|} P_{A^*}(a)\log P_{\hat{A}}(a).$$

Rule 2: Typical-set Rule:

$$P(A_i) = \underset{P(A^*)\in\mathcal{P}\setminus\{P(A_1),\ldots,P(A_{i-1})\}}{\operatorname{argmin}} D_{KL}(P(A^*)\|P(\hat{A})).$$

where $\mathcal{P}$ is the set of all possible types of length-l symbol sequences, and $D_{KL}(P\|Q)$ is the KL divergence between P and Q.

Rule 1 chooses the types whose sequences happen with highest probability under $P(\hat{A})$. On the other hand, Rule 2 chooses the types that are most similar to $P(\hat{A})$. The codebooks built using Rules 1 and 2 are related to the concept of high-probability set and typical set in information theory, respectively. The codebooks built using high-probability and typical-set rules can be denoted using $c_{HP}$ and $c_{TS}$, respectively.

A v-memory-element convolutional code which takes a $k_0$-bit input symbol and generates an $n_0$-bit output symbol in one stage can be denoted as an $(n_0, k_0, v)$ convolutional code. Each input symbol can be referred to as a data frame, and each output symbol can be referred to as a code frame. In many embodiments, a $(k_0+1, k_0, v)$ convolutional code is utilized. The convolutional code in FIG. 4 has $k_0=2$, where $\mathcal{U}=\{0, 1, \ldots, 2^{k_0}-1\}$ is the set of input symbols and $\mathcal{L}=\{0, 1, \ldots, 2^{n_0}-1\}$ is the set of output symbols. The input symbol and output symbol in stage t can be denoted by $u_t$ and $l_t$, respectively. A convolutional code with n data frames can be described as an n-stages trellis. The set of vertices (or states) at time instant t can be denoted by $\mathcal{V}_t$. An edge that starts with $v_t$, ends at $v_{t+1}$ and has an output $l_t$ can be denoted by a 3-tuple $(v_t, l_t, v_{t+1})$. In many embodiments, $\varepsilon_t$ is the set of edges in stage t and $\mathcal{V}_t=\mathcal{V}=\{0, 1, \ldots, 2^v-1\}$, and $\varepsilon_t=\varepsilon$. In which case, the sequence $(v_0, l_0, v_1, l_1, \ldots, l_{n-1}, v_n)$ is a valid path in the trellis, and a tail-biting path requires $v_0=v_n$. The TBCC trellis and sub-trellises whose starting and ending state are i, i∈ $\mathcal{V}$, can be denoted by T and $T_i$, respectively.

Figure 7:
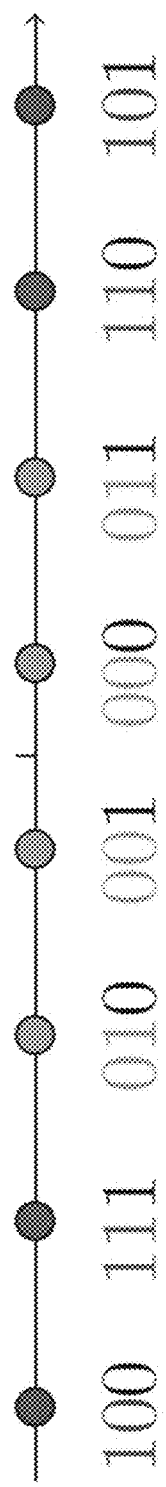
FIG. 7 illustrates binary labels assigned to equidistant to an 8-AM constellation set using set partitioning.

In order to maximize free Euclidean distance (ED) of the TCM, Ungerboeck proposed a mapping rule called "mapping by set partitioning". This mapping rule follows from successive partitioning of a channel-signal set into subsets with increasing minimum distance between the signals in these subsets. FIG. 7 gives binary labels for equidistant 8-AM constellation set using set partitioning. The labeling in FIG. 7 uses the first two bits to indicate the magnitude and uses the last bit to indicate the sign.

While much of the discussion above focuses on the benefits of using an MCDM, it should be readily appreciated that any of a variety of different DMs can be utilized to perform PAS during the encoding of short messages in accordance with various embodiments of the invention. Furthermore, while many embodiments of the invention use MCDMs and perform decoding based upon the use of an MCDM to perform PAS, embodiments of the invention are not limited to the use of MCDMs and can employ any of a variety of different types of DMs including (but not limited to) a fixed-to-fixed distribution matcher and/or a CCDM.

Specific processes for decoding short messages encoded in accordance with various embodiments of the invention are discussed further below.

Error Detection Encoders

Communication systems in accordance with many embodiments of the invention employ error detection encoders to provide check bits that can be utilized by a receiver to detect decoding errors. In many embodiments, the error detection encoder is located after a DM. As noted above, the check bits generated by the error detection encoder are equally likely (even when the input buts are not). A variety of different error detection codes can be utilized to perform error detection encoding as appropriate to the requirements of specific applications in accordance with various embodiments of the invention. As is discussed further below, a polynomial error detection code and a CC code utilized within a TCM can be selected through a joint optimization with respect to a frame error rate (FER) bound.

The output of a DM can be considered to be a random variable denoted by the symbol $\overline{A}$ with PMF $P(\overline{A})$. Because the cardinality of output symbol set is $2^{k_0}$, $\overline{A}$ can be represented by $k_0$ bits, which are denoted by $B_i$, i=0, ..., $k_0-1$. Since $\overline{A}$ is not uniform, $B_i$, i=0, ..., $k_0-1$, may have different distributions. When a∈ $\mathcal{A}$ is a realization of $\overline{A}$, and $b(a)=[b_{k_0-1}(a) \ldots b_1(a)b_0(a)]\in \mathbb{F}_2^{k_0}$ is the binary representation of a, the PMF of $B_i$ can be calculated by:

$$P_{B_i}(b) = \sum_{a=0}^{|\mathcal{A}|-1} P_{\overline{A}}(a)\mathbb{I}(b_i(a) = b), b = 0, 1, i = 0, 1, \ldots, k_0 - 1 \quad \text{Eq. 4}$$

$\mathbb{I}(\cdot)$ is the indicator function.

In the transmitter, the binary converter maps a length-l symbol sequence output by the DM to a length-$k_0 l$ binary sequence. A random vector $G^{k_0 l}=[G_0, \ldots, G_{k_0 l-1}]$ can be defined that represents the binary sequence. Assuming that the DM generates i.i.d. symbols, the $G_i$'s that correspond to the same symbol bit position have the same distribution, i.e.:

$$P(G_i)=P(B_{i(\operatorname{mod} k_0)}), i=0, \ldots, k_0 l-1.$$

When g∈ $\mathbb{F}_2^{k_0 l}$ is a realization of $G^{k_0 l}$, the polynomial form of g can be denoted by $g(x)=\sum_{i=0}^{k_0 l-1} g_i x^i$. Furthermore, an m-bit error detection code can be specified by a degree-m binary polynomial $p(x)=\sum_{i=0}^{m} p_i x^i$. The polynomial form of the output of the error detection encoder can be expressed as $h(x)=\sum_{i=0}^{k_0 l+m-1} h_i x^i$, where h(x) is calculated as follows:

$$h(x)=x^m g(x)+x^m g(x)(\operatorname{mod} p(x)).$$

The check bits, $h_i$, i=0, ..., m−1, can be arbitrarily close to be equally likely, with a proper choice of l.

The output of the error detection encoder can be provided to the TCM. Various techniques for performing TCM are described below to provide context for describing processes for performing the joint design of error detection code and CC combinations for use in the encoding of short messages in accordance with various embodiments of the invention.

Trellis Coded Modulation Using Tail-Biting Convolutional Codes

In a number of embodiments, TCM is performed using a length-n, rate $$-\frac{k_0}{k_0 + 1},$$

systematic TBCC that requires at least v memory elements. The input symbol in stage t of the TCM can be denoted by $u_t \in \mathcal{U}$, t=0, ..., n−1, and the state at time can instant t can be denoted by $v_t \in \mathcal{V}$, t=0, ..., n. Let $b(u_t) \in \mathbb{F}_2^{k_0 \times 1}$, where $b(v_t) \in \mathbb{F}_2^{v \times 1}$ is the binary representation of $u_t$ and $v_t$, respectively. Based on a state-space representation of the convolutional code, $b(v_{t+1})$ is a function of $b(v_t)$ and $b(u_t)$, i.e., $b(v_{t+1}) = Ab(v_t) + Bb(u_t)$, where $A \in \mathbb{F}_2^{v \times v}$ and $B \in \mathbb{F}_2^{v \times k_0}$. Accordingly, the initial state $v_0$ of a recursive TBCC codeword can be determined by the following equation:

$$b(v_0) = (A^n + I_v)^{-1} b(v_n^{[zs]}), \quad \text{Eq. 5}$$

where $I_v$ is a size v identity matrix and $A^n + I_v$ is an invertible matrix.

The term $v_N^{[zs]}$ can be used to refer to a zero-state solution, which is the final state when encoding a dataword with initial state 0. Encoding using a tailbiting convolutional code has two steps:
1. Run the encoding process a first time by setting $v_0 = 0$ and record $v_n^{[zs]}$.
2. Run the encoding process a second time by setting $v_0$ using Equation 5 and generate output symbols.

In a TCM, the output symbols generated by a TBCC can be mapped to channel inputs $x = [x_0, x_1, \ldots, x_{n-1}]$, where $x \in X$. The TBCC encoder and set-partitioning mapping function result in $P_{X_t}(x) = P_{X_t}(-x)$, for $x \in X$.

The output of the channel-signal mapper that can be used to generate an input to the communication channel at stage t can be denoted as $X_t$, which has $P_{X_t}(x) = P_{X_t}(-x)$, for $x \in X$. The magnitude distributions of the first $$n - \frac{k_0}{m}$$

symbols and last $$\frac{k_0}{m}$$

symbols follow $P(\overline{A})$ and a uniform distribution, respectively. Hence, if the distribution matcher is designed to generate magnitude symbols with a proper PMF, in some instances accounting for the fact that the error detection check bits have a uniform distribution, the channel inputs of communication system can have a symmetric capacity-approaching distribution. In many embodiments, the error detection code and TBCC that are utilized by the communication are designed to optimize an FER bound. As can readily be appreciated, the performance of a communication system is often dependent upon the implementation of the receiver utilized within the communication system. Accordingly, various receivers that can be utilized to receive short messages encoded in accordance with various embodiments of the invention are presented below, prior to discussing the joint optimization of error detection and TBCC codes.

Receiver Architectures

A variety of different decoding processes with varied complexity and error correction performance can be utilized within receivers capable of receiving short messages encoded in accordance with various embodiments of the invention. Channel observations at a receiver over a channel having AWGN channel characteristics can be modelled as $y = x + z$, where $z \sim \mathcal{N}(0, \sigma^2 I)$ is the noise vector and $\sigma^2$ is the noise variance. In such a system, codewords can be defined as follows:

Definition 2. $x \in X^n$ is a codeword if it satisfies all of the following conditions:
1. x is a codeword of the TCM.
2. The dataword of the TCM that generates x, h, passes a CRC check.
3. The information bits of h, g, is the binary representation of a codeword in $c_{DM}$.

The codebooks of a communication systems in accordance with various embodiments of the invention can be denoted by $c_{CTP}$, where $|c_{CTP}| = 2^k$.

Figure 8:
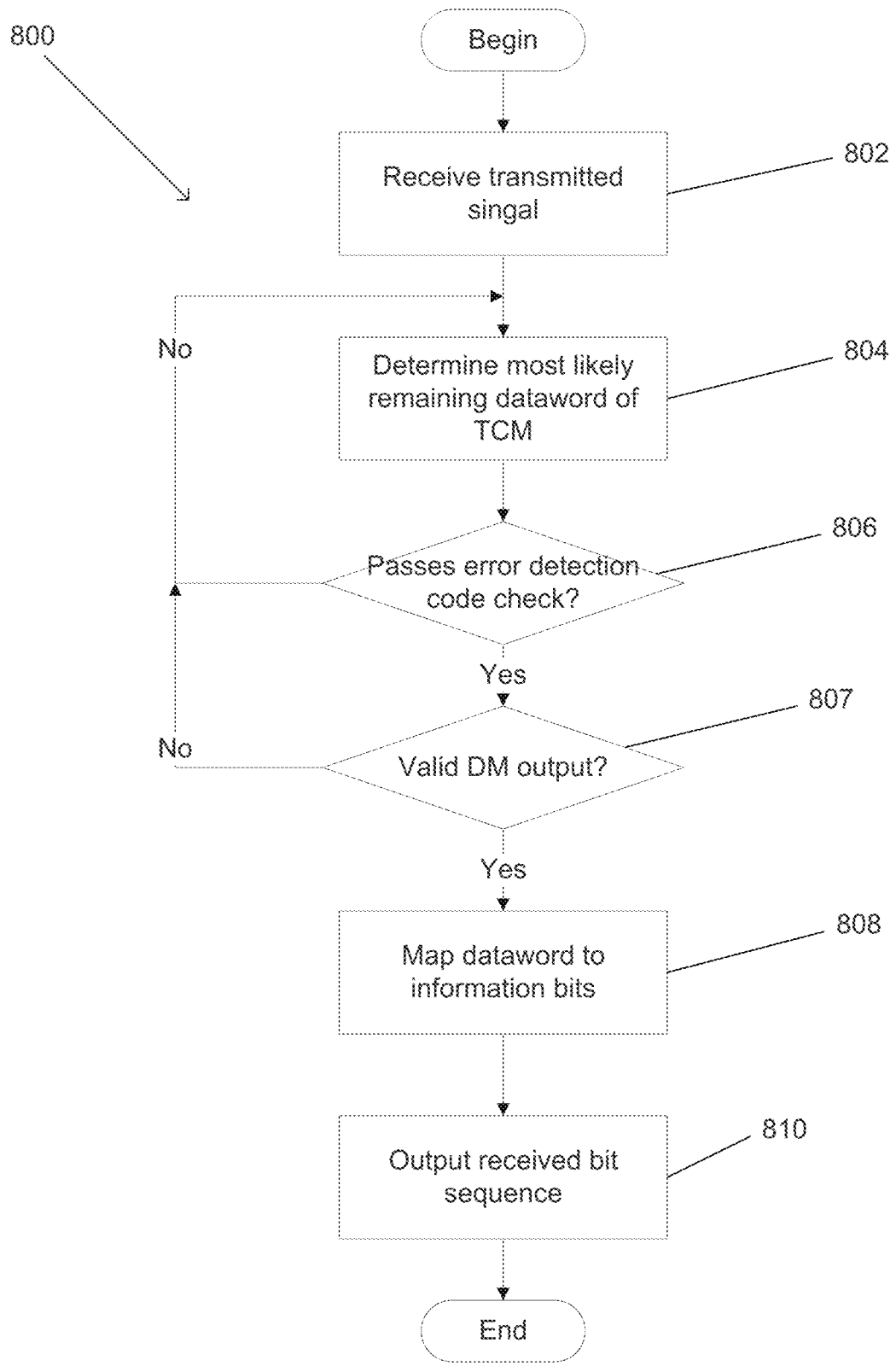
FIG. 8 illustrates a process for decoding a short message encoded in accordance with an embodiment of the invention.

A process for decoding a short message encoded in accordance with an embodiment of the invention is illustrated in FIG. 8. The process 800 includes receiving (802) a transmitted signal and determining (804) a dataword of the TCM that was most likely to have been transmitted based upon the received signal. The correctness of the determined dataword of the TCM can be verified using an error detection code check (806). When the determined dataword of the TCM fails the error detection code check, the process determines the next most likely dataword of the TCM based upon the received signal. When the determined dataword of the TCM passes the error detection code check, a determination (807) is made as to whether the dataword is a valid DM output. When the dataword is a valid DM output, the dataword of the TCM is mapped (808) to information bits based upon the codebook of the DM used in the transmitter and the information bits are output (810) as the received bit sequence. When either the error detection code check fails or a determination is made that the dataword is not a valid DM output, then the process determines (804) the most likely remaining dataword of the TCM and repeats. In a number of embodiments, the decoder will declare an erasure after checking a certain number of datawords without successfully decoding the received message.

In embodiments in which the error detection encoding is applied prior to PAS, the decoding process involves first checking that the most likely (remaining) data word is a valid distribution-matcher output. If a most likely (remaining) dataword is a valid distribution-matcher output, then the distribution matcher inverter can recover the corresponding input bits by mapping the dataword of the TCM to information bits, which include the check bits generated using the error detection code. Once the check bits are recovered, the error detection code check can be performed. As can readily be appreciated, the computational cost of performing the error detection code check can be significantly lower compared to performing DM decoding. Accordingly, the possibly improved PAS that comes with performing PAS after the generation of the error detection code check bits may come at the expense of increased decoding complexity when the initial most likely dataword of the TCM is incorrect.

While various processes are described above with reference to FIG. 8, a number of different decoder implementations can be utilized to perform decoding of short messages encoded in accordance with various embodiments of the invention as appropriate to the requirements of specific applications. For example, the process shown in FIG. 8 can alternatively employ a parallel list Viterbi decoder (See Seshadri, N. and Sundberg, C. E., 1994. List Viterbi decoding algorithms with applications. *IEEE transactions on communications*, 42(234), pp. 313-323, the disclosure of which including the disclosure regarding the implementation of serial and parallel List Viterbi Decoders is incorporated by reference herein in its entirety). In which case, error detection code checks (806) and DM output validity determinations (807) can be performed in parallel to either decode (808, 810) the received output bit sequence or declare an erasure. Several decoder implementations that can be utilized in accordance with certain embodiments of the invention are discussed further below.

An ML decoder is capable of finding $\hat{x} \in c_{CTP}$ that has smallest Euclidean distance with y, i.e.:

$$\hat{x} = \underset{x \in C_{CTP}}{\operatorname{argmin}} \|x - y\|_2^2. \qquad \text{Eq. 2}$$

Because the codewords in $c_{CTP}$ are equally likely, an ML decoder can be optimal. Equation 2 can be realized by serial list Viterbi decoding (SLVD). A SLVD first finds the most likely path in a tail-biting trellis T. If the estimation corresponded to this path is not a codeword in $c_{CTP}$, then SLVA can be used again to find the next mostly likely path. If a path belongs to the sub-trellis $T_i$, the Trellis-tree algorithm (TTA) for $T_i$ can be used for tracing back that path.

ML decoding complexity comes from two parts. First, in the initialization step, the metrics of local best paths in each of $2^v$ sub-trellises need to be calculated. Second, if a path in $T_i$ needs to be traced back, a data set of TTA for $T_i$ needs to be constructed and maintained.

One solution to save complexity when implementing an ML decoder is to only consider a subset of $2^v$ states, which can be denoted by $\tilde{\mathcal{V}} \subseteq \mathcal{V}$. A decoder that considers $\beta$ starting states can be referred to as $\beta$-States decoder, where $v(x)$ denotes the TBCC initial state of the codeword x. The $\beta$-States decoder solves the following problem:

$$\hat{x} = \underset{\substack{x \in C_{CTP} \\ v(x) \in \tilde{\mathcal{V}}}}{\operatorname{argmin}} \|x - y\|_2^2 \qquad \text{Eq. 3}$$

An ensemble decoding algorithm can employ M parallel independent and identical sub-optimal decoders each proposing a codeword estimate, and can select the most likely candidate as the decoder output. The automorphism group is the set of permutations such that the permuted sequence of any codeword is still a codeword. When the automorphism group of the codes is known, identical constituent decoders decoding permuted versions of the channel output may be used, yielding the so-called AE decoding.

Figure 9:
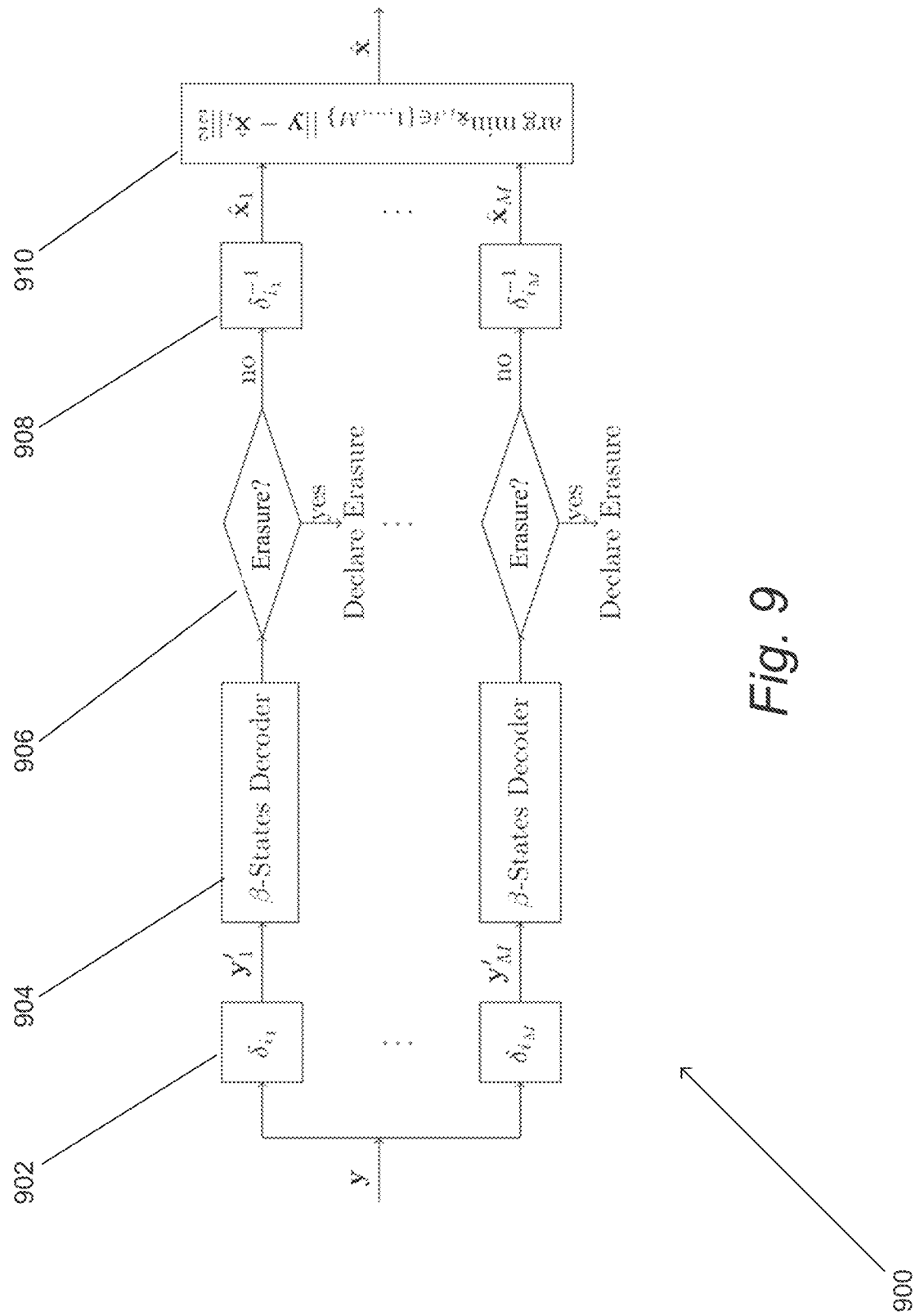
FIG. 9 illustrates an AE decoder in accordance with an embodiment of the invention.

An AE decoder in accordance with an embodiment of the invention is illustrated in FIG. 9. The cyclic shifts $\delta_i$, i=0, . . . n−1 (902) are elements of an automorphism group of the TBCC. $\delta_i$ represents cyclic shifting a sequence by i positions. Hence, an AE decoder for the communication system can be constructed by employing M parallel β-state decoders (904) for the channel observations that are cyclic-shifted by $\{\delta_{i_1}, \ldots, \delta_{i_M}\}$ (904, 908). The $i^{th}$ β-state decoder either provides a shifted estimation candidate or declares (906) an erasure. The output (910) of the AE decoder is the candidate that has the smallest Euclidean distance with the channel observation. Such an AE decoder can be denoted by AED(M, β).

While specific receivers and/or decoders are described above, any of a variety of receivers and/or decoders can be utilized to decode short messages encoded in accordance with various embodiments of the invention. As noted above, communication system performance can be impacted by decoder performance. In several embodiments, knowledge of the decoding process utilized within a communication system is utilized to jointly develop an error detection code polynomial and a CC by optimizing the performance of the error detection code and CC within the communication system with respect to a FER bound. Processes for obtaining an error detection code and CC pair for use within a communication system in accordance with an embodiment of the invention, including (but not limited to) processes that obtain error detection code and CC pairs that achieve performance in excess of Polyanskiy's RCU bound, are discussed further below.

Joint Optimization of Error Detection Codes and CC

An FER upper bound for a communication system with a specified error detection code, CC, and an ideal distribution can be generated. In many embodiments, the upper bound can be computed using the generating function of an equivalent convolutional code whose error events correspond exactly to the undetectable error events of the concatenation of the original error detection code polynomial and the polynomial of the CC. Using this upper bound, an efficient communication system can be built using an error detection code and CC pair that is obtained through optimization based upon the upper bound and a DM with a small normalized KL divergence. In this way, communication systems in accordance with many embodiments of the invention can achieve performance exceeding Polyanskiy's RCU bound and approaching the Shannon '59 SP limit.

In many embodiments, the binary representation of the symbol sequence generated by a DM is encoded by a polynomial error detection code and a TBCC serially. This combination of a polynomial error detection code and convolutional encoder can be viewed as equivalent to a single convolutional encoder with input q, which is the quotient of dividing the error detection code codeword by the error detection code polynomial. Using this insight, an optimizer can be built that can obtain an error detection code and TBCC pair that optimizes a specific measure such as (but not limited to) a FER bound.

A length-($\tilde{l}$+m) error detection codeword h can be generated with polynomial form $h(x) = \sum_{t=0}^{\tilde{l}+m+1} h_t x^6$. Based on the notation used above, $\tilde{l} = k_0 l$. For a rate $$-\frac{k_0}{k_0 + 1}$$

convolutional code, there are $k_0$ input branches. The input of the $i^{th}$ branch and corresponded polynomial can be denoted by $h^{(i)}$ and $h^{(i)}(x)$, respectively. Sampling h every $k_0$ positions starting from $i^{th}$ position results in $h^{(i)} = [h_i \ h_{k_0+i} \ \ldots \ h_{\tilde{l}+m-k_0+i}]$, and $h^{(i)}(x) = \sum_{t=0}^{(\tilde{l}+m)/k_0-1} h_{k_0 t+i} x^t$, i=0, . . . , $k_0$−1.

Dividing the error detection code output by the error detection code polynomial provides the quotient q. The polynomial form of q, q(x), can be calculated as follows:

$$q(x) := h(x)/p(x). \qquad \text{Eq. 6}$$

Analogously to $h^{(i)}$, $q^{(i)}$ can denote the sequence that results from sampling q every $k_0$ positions starting from $i^{th}$ position. The polynomial vectors $h_{k_0}(x) = [h^{(0)}(x) \ldots h^{(k_0-1)}(x)]$ and $q_{k_0}(x) = [q^{(0)}(x) \ldots q^{(k_0-1)}(x)]$ can be referred to as the $k_0$-split polynomial vectors of h(x) and q(x), respectively.

An m-bit error detection encoder which is specified by an m-degree polynomial p(x) can receive a number of input bits be $\tilde{l}$, where $k_0$ is an integer that divides m+$\tilde{l}$. For any codeword polynomial h(x), its $k_0$-split polynomial vector, $h_{k_0}(x)$ can be calculated by:

$$h_{k_0}(x) = q_{k_0}(x) P_{eq}(x), \qquad \text{Eq. 7}$$

where $q_{k_0}(x)$ is the $k_0$-split polynomial vector of $q(x)$ that is calculated by Equation 6 and $P_{eq}(x) \in \mathbb{F}_2[x]^{k_0 \times k_0}$ is a $k_0 \times k_0$ square binary polynomial matrix.

As a result, the concatenation of a polynomial error detection code with generator polynomial $p(x)$ and a rate $$-\frac{k_0}{k_0+1}$$

convolutional code with generator matrix $G(x)$ is equivalent to a convolutional code with generator matrix $G_{eq}(x)$, which can be defined as follows:

$$G_{eq}(x) = P_{eq}(x)G(x). \quad \text{Eq. 8}$$

The error events of the equivalent convolutional code correspond to the undetectable error events of the original concatenation of the polynomial error detection code and CC. Because the concatenation of a polynomial error detection code expurgates the original TBCC by removing the codewords whose corresponding messages do not pass the error detection code check, the remaining codewords all meet the tail-biting condition so that the equivalent convolutional code is also tail-biting.

Developing an FER Upper Bound

The computation of an FER for a CC that is equivalent to a concatenation of a polynomial error detection code and CC pair utilizes the output symbol distributions. Many embodiments utilize a distribution matcher that generates 1 i.i.d. symbols with the target symbol distribution $P(A)$. After the distribution matcher, n–1 error detection code symbols are appended to the sequence. These error detection code symbols can be approximated as having a uniform distribution rather than $P(A)$. The output symbol distributions for the analyzed system of the equivalent TBCC with the generator matrix given in Equation 8 with the DM are thus 1 output symbols distributed according to $P(A)$ and n–1 output symbols distributed according to a uniform distribution.

The codebook of the TCM can be referred to as $\mathcal{C}_T \subset X^n$, where $x_c \in \mathcal{C}_T$ and $y$ can be used to refer to the transmitted codeword and the channel observation over AWGN channel, respectively. The event that, given $y$, the decoder estimation $\hat{x} \neq x_c$ can be denoted as $\varepsilon_{x_c}$. The event that, given $y$, codeword $x_e$ is more likely than codeword $x_c$, can be denoted as $e_{x_c,x_e}$. The FER of the communication system $P_e$ can be upper bounded by the union bound:

$$P_e \leq \sum_{x_c \in \mathcal{C}_T} P(X^n = x_c) \sum_{\substack{x_e \in \mathcal{C}_T \\ x_e \neq x_c}} P(e_{x_c,x_e}) \quad \text{Eq. 9}$$

The $P(e_{x_c,x_e})$ can be referred as the pairwise error probability (PEP). Because $P(X^n)$ is non-uniform, choosing the codeword that has smallest Euclidean distance with the channel observation is not necessarily optimal. The convolutional inputs corresponding to outputs $x_c$, $x_e$ can be denoted as $u_c$, $u_e$. Using this notation, $e_{x_c,x_e}$ happens if $P_{X^n|Y^n}(x_e|y) > P_{X^n|Y^n}(x_c|y)$, which is a condition that is equivalent to:

$$2\langle y - x_c, x_e - x_c \rangle - \|x_c - x_e\|_2^2 > 2\sigma^2 \log\left(\frac{P_{X^n}(x_c)}{P_{X^n}(x_e)}\right). \quad \text{Eq. 10}$$

where $\langle \cdot, \cdot \rangle$ represents inner product.

By defining $$z' = \frac{\langle y - x_c, x_e - x_c \rangle}{\|x_c - x_e\|_2},$$

it can be proven that $z' \sim \mathcal{N}(0, \sigma^2)$. By rewriting Equation 10, it can be shown that $e_{x_c,x_e}$ occurs if the following inequality is satisfied:

$$z' > \frac{1}{2}\|x_c - x_e\|_2 + \frac{\sigma^2}{\|x_c - x_e\|_2}\log\left(\frac{P_{X^n}(x_c)}{P_{X^n}(x_e)}\right) \triangleq \frac{1}{2}d(x_c, x_e). \quad \text{Eq. 11}$$

Note that d is not a metric as $d(x_c, x_e) \neq d(x_e, x_c)$. Applying Equation 11 yields:

$$P(e_{x_c,x_e}) = Q\left(\frac{\sqrt{d^2(x_c, x_e)}}{2\sigma}\right). \quad \text{Eq. 12}$$

Based on Equation 11, $d^2(x_c, x_e)$ can be calculated by:

$$d^2(x_c, x_e) = \quad \text{Eq. 13}$$
$$\|x_c - x_e\|_2^2 + 4\sigma^2\log\left(\frac{P_X^n(x_c)}{P_X^n(x_e)}\right) + \left(\frac{2\sigma^2}{\|x_c - x_e\|_2^2}\log\left(\frac{P_X^n(x_c)}{P_X^n(x_e)}\right)\right)^2.$$

By defining $d_{prox}^2(x_c, x_e)$ by abandoning the square term in Equation 13, the following expression is obtained:

$$d_{prox}^2(x_c, x_e) = \|x_c - x_e\|_2^2 + 4\sigma^2\log\left(\frac{P_X^n(x_c)}{P_X^n(x_e)}\right). \quad \text{Eq. 14}$$

Because $d_{prox}^2(x_c, x_e) \leq d^2(x_c, x_e)$, the PEP $P(e_{x_c,x_e})$ is upper bounded by:

$$P(e_{x_c,x_e}) = Q\left(\frac{\sqrt{d^2(x_c, x_e)}}{2\sigma}\right) \leq Q\left(\frac{\sqrt{d_{prox}^2(x_c, x_e)}}{2\sigma}\right). \quad \text{Eq. 15}$$

Based on the independence assumption, the distance $d_{prox}$ has the desirable property of being additive in the components, i.e., $$d_{prox}^2(x_c, x_e) = \sum_{i=1}^n d_{prox}^2(x_{c,i}, x_{e,i}), \quad \text{Eq. 16}$$

where $x_{c,i}$ and $x_{e,i}$ are the $i^{th}$ element in $x_c$ and $x_e$, respectively, and $$d_{prox}^2(x_{c,i}, x_{e,i}) = (x_{c,i} - x_{e,i})^2 + 4\sigma^2\log\frac{P_{X_i}(x_{c,i})}{P_{X_i}(x_{e,i})}.$$

Besides, the omitted term $$\left(\frac{2\sigma^2}{\|x_c - x_e\|_2^2}\log\left(\frac{p(u_c)}{p(u_e)}\right)\right)^2 \sim (\sigma^2)^2. \qquad \text{Eq. 17}$$

As a result, $d_{prox}^2$ approaches $d^2$ quadratically with SNR. By obtaining an upper bound on the FER of the communication system, the upper bound can be used to generate a polynomial error detection code and CC pair using techniques including the techniques described below.

Generating Polynomial Error Detection Code and CC Pairs Using FER Upper Bounds

Communication systems implemented in accordance with various embodiments of the invention are able to exceed Polyanskiy's RCU bound and approach the Shannon '59 SP limit. These levels of performance can be achieved through the use of error detection codes and CCs that are optimized for the specific communication system using a process that is capable of generating an optimized error detection code and CC through a design process that optimizes a specific measure including (but not limited to) an upper bound on the FER performance of the system. In many embodiments, the iteration is iterative and terminates once a particular performance threshold is reached (i.e. the optimized polynomial error detection code and CC pair is not necessarily optimal). In several embodiments, the optimization process terminates once the polynomial error detection and CC pair achieve a performance in excess of Polyanskiy's RCU bound by some margin. As can readily be appreciated, the specific optimization process and criterion for determining when a polynomial error detection code and CC are optimized is largely dependent upon the requirements of a specific communication system.

With specific regard to establishing an FER upper bound for a communication system similar to those described above, the generating function of a non-uniform-input TCM can be derived using Biglieri's product state method in combination with a state-reduction method. A product state diagram for the TCM can be built by replacing each state in the error state diagram with a complete encoder state diagram. Hence, for a convolutional code that has v memory elements, there are a total of $2^{2v}$ states in the product state diagram. The total number of states can be reduced by proposing an "equivalent-class encoder" with $v_x$ memory elements. Because $v_x < v$, the state-reduction method delivers a smaller number of states than a product state diagram.

For an equivalent-class encoder, the set of outputs can be denoted as $\mathcal{L}_q$, where $q \in \mathcal{L}_q$ is an output of the equivalent-class encoder. The symbol error can be defined as $e_0 \in \mathcal{L}$, where $\mathcal{L}$ is the set of TBCC output symbols. In this context, $x_q$, $x_{qe_0}$ refer to any constellation point that belongs to equivalent class q and the constellation point that $x_q$ moves to because of $e_0$. Accordingly, $d_{prox}^2(q, e_0)$ can be defined as follows:

$$d_{prox}^2(q, e_o) = (x_q - x_{qe_o})^2 + 4\sigma^2 \log\frac{P_X(x_q)}{P_X(x_{qe_o})}. \qquad \text{Eq. 18}$$

The set of equivalent-class encoder states and the set of error states can be denoted by $\mathcal{S}_q$ and $\mathcal{S}_e$, respectively. The pair $(s_q, s_e) \in \mathcal{S}_q \times \mathcal{S}_e$ describes where the states "should be" if no error occurs, and where the state has "drifted to" because of some error event. The notation "×" means Cartesian product. When $(s_q, s_e)$, $(t_q, t_e) \in \mathcal{S}^*$, the state transition $(s_q, s_e) \to (t_q, t_e)$ can be labelled with $$P(s_q \to t_q) \sum_{e_o} \sum_{q'} P(q' \mid s_q \to t_q) W^{d_{prox}^2(q, e_o)} \qquad \text{Eq. 19}$$

where $s_q \to t_q$ is the event that the state of the equivalent class encoder transits from $s_q$ to $t_q$.

The first summation in Equation 19 is over all possible symbol errors $e_0$ due to error state diagram transition $s_e \to t_e$, and the second summation is over all possible equivalent class q' due to equivalent-class encoder state diagram transition $s_q \to t_q$.

Based on the channel-signal mapping rule, the constellation of the TCM output is symmetric with respect to 0 and the equivalence class can be determined by the systematic bits. Thus, one generator polynomial matrix of the minimal equivalent-class encoder for the rate $$\frac{k_0}{k_0 + 1},$$

systematic TBCC in TCM is simply a size-$k_0$ identity matrix. It is sufficient to use the error state diagram to compute the transfer function, and the label of transition $s_e \to t_e$ is $\Sigma_{e_0} \Sigma_{q \in \mathcal{L}_q} P(q) W^{d_{prox}^2(q, e_0)}$. The equivalent class q of the constellation of the TCM output is associated to the magnitude of constellation point, which has either capacity-approaching distribution P(A) for the first n−1 output symbols, or uniform distribution for the last 1 output symbols. The $|\mathcal{S}_e| \times |\mathcal{S}_e|$ matrices $G_A(W)$ and $G_{uni}(W)$ can be defined that enumerate all possible state transitions with equivalent-class PMFs of P(A) and uniform distribution as follows:

$$G_A(W)_{s_e, t_e} = \sum_{e_o} \sum_q P_A(q) W^{d_{prox}^2(q, e_o)} \qquad \text{Eq. 20}$$

$$G_{uni}(W)_{s_e, t_e} = \sum_{e_o} \sum_q \frac{1}{|\mathcal{A}|} W^{d_{prox}^2(q, e_o)} \qquad \text{Eq. 21}$$

The generating function of the TCM system can be defined as follows:

$$T_{TBCC}(W) = -1 + \sum_{i=0}^{|\mathcal{S}_e|} v_i B_A^i(W) G_{uni}^{n-i}(W) v_i^T \qquad \text{Eq. 22}$$

where $v_i$ is a length $|\mathcal{S}_e|$ indicator vector where $v_{i,j} = \mathbb{1}(j=i)$.

For the TBCC, the error events must be tail-biting paths, $v_i$ selects the starting/ending state of the error events.

The free distance can be defined as $$d_{free} = \min_{x_c, x_e \in C_T} d_{prox}(x_c, x_e).$$

Using the bound on the Q-function, $P_e$ is bounded by:

$$P_e \leq Q\left(\frac{\sqrt{d_{free}^2}}{2\sigma}\right) \exp\left(\frac{d_{free}^2}{8\sigma^2}\right) \qquad \text{Eq. 23}$$

-continued $$\sum_{x_c \in \mathcal{C}_T} \sum_{\substack{x_e \in \mathcal{C}_T \\ x_e \neq x_c}} \prod_{i=1}^n \left[ \exp\left( -\frac{d_{prox}^2(x_{c,i}, x_{e,i})}{8\sigma^2} \right) P_{X_i}(x_{c,i}) \right]$$

The double summation term in Equation 23 can be rewritten as follows:

$$\sum_{x_c \in \mathcal{C}_T} \sum_{\substack{x_e \in \mathcal{C}_T \\ x_e \neq x_c}} \prod_{i=1}^n \left[ \exp\left( -\frac{d_{prox}^2(x_{c,i}, x_{e,i})}{8\sigma^2} \right) P_{X_i}(x_{c,i}) \right] =$$

$$\sum_{x_c \in \mathcal{C}_T} \sum_{\substack{x_e \in \mathcal{C}_T \\ x_e \neq x_c}} \left[ W^{d_{prox}^2(x_c, x_e)} P_X^n(x_c) \right]\Big|_{W=e^{-\frac{1}{8\sigma^2}}} =$$

$$\sum_{\substack{x_c \in \mathcal{C}_T \\ x_e \in \mathcal{C}_T}} \left[ W^{d_{prox}^2(x_c, x_e)} P_X^n(x_c) \right]\Big|_{W=e^{-\frac{1}{8\sigma^2}}} - 1 =$$

$$\sum_{\substack{q \in \mathcal{L}_q^n \\ e \in \mathcal{C}_T^n}} \prod_{i=1}^n \left[ W^{d_{prox}^2(q_i, e_i)} P(q_i) \right]\Big|_{W=e^{-\frac{1}{8\sigma^2}}} - 1 =$$

$$\sum_{i=0}^{|S_e|} v_i G_A^i(W) G_{uni}^{n-i}(W) v_i^T \Big|_{W=e^{-\frac{1}{8\sigma^2}}} - 1$$

As a result, the FER upper bound can be calculated using the generating function $T(W)$ by:

$$P_e \leq Q\left( \frac{\sqrt{d_{free}^2}}{2\sigma} \right) \exp\left( \frac{d_{free}^2}{8\sigma^2} \right) T_{TBCC}\left( W = e^{-\frac{1}{8\sigma^2}} \right).$$

The above FER upper bound can be used to estimate the performance of different communication systems that encode short messages using any of the techniques described herein. In addition, the FER upper bound can be utilized within an optimizer that is configured to select the parameters of a polynomial error detection code and a CC code pair. In many embodiments, the encoder can be constrained to produce cyclic polynomial error detection codes. In other embodiments, non-cyclic polynomial error detection codes can be identified through optimization and utilized within communication systems implemented in accordance with various embodiments of the invention. In certain embodiments, the optimization process can select a polynomial error detection and CC code pair that enables the communication system to achieve performance in excess of Polyanskiy's RCU bound and approaching the Shannon '59 SP limit. The performance of a communication system that transmits short messages encoded in accordance with various embodiments of the invention over an AWGN channel with different DMs and decoding methods is considered below.

Performance Comparisons

Communication systems in accordance with several embodiments of the invention use degree-2 CRCs and rate-2/3 TBCCs. In several embodiments, the channel inputs are equidistant 8-PAM symbols. The capacity-approaching amplitude distribution P(A) that DMs target for can be optimized using the DAB algorithm at an SNR of 8 dB. Note that this transmission system can be designed for any quadrature amplitude modulation (QAM) scheme, and the points in the QAM constellation are not necessarily equal-distant. Furthermore, communication systems in accordance with various embodiments of the invention can be designed for use with any degree CRC and any rate TBCC appropriate to the requirements of specific applications.

Figure 10:
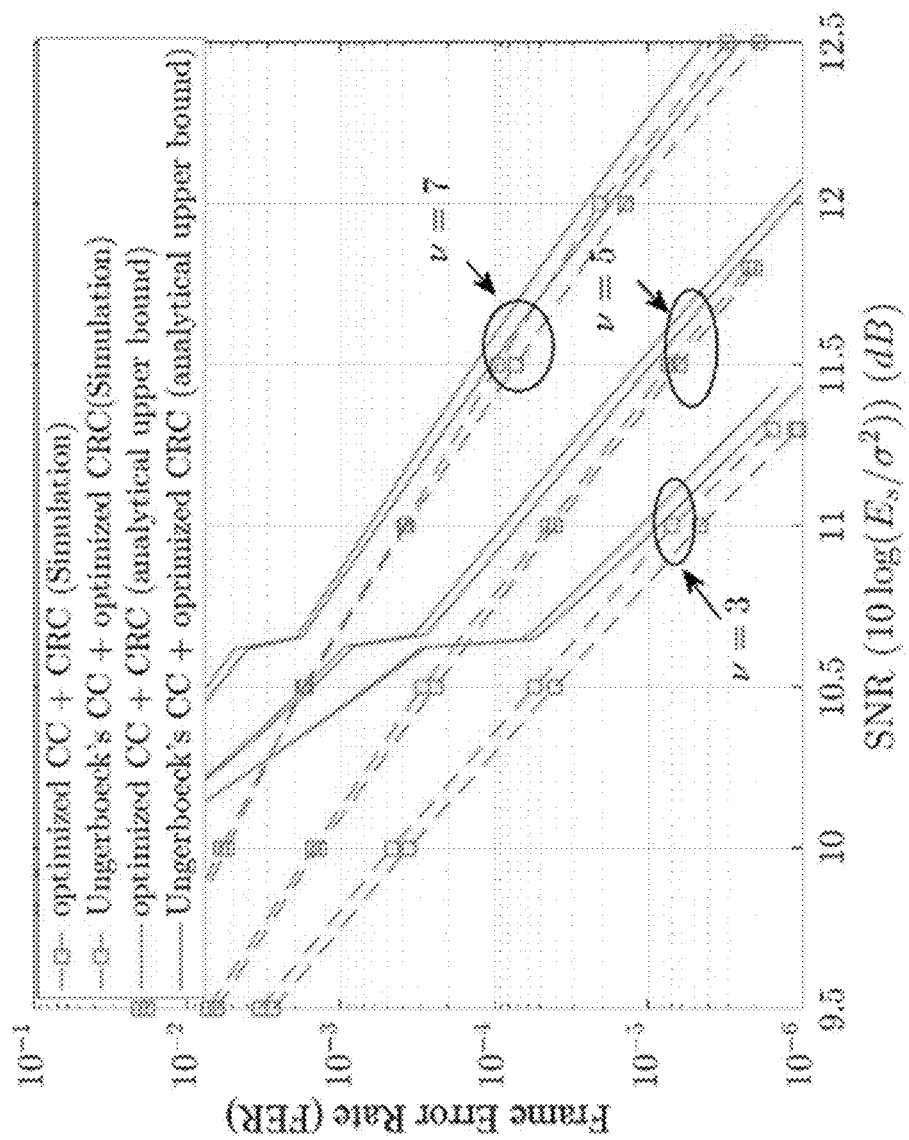
FIG. 10 presents analytical upper bounds and FERs curves of a CRC-TCM-PAS system that uses an idealized DM.
Figure 11:
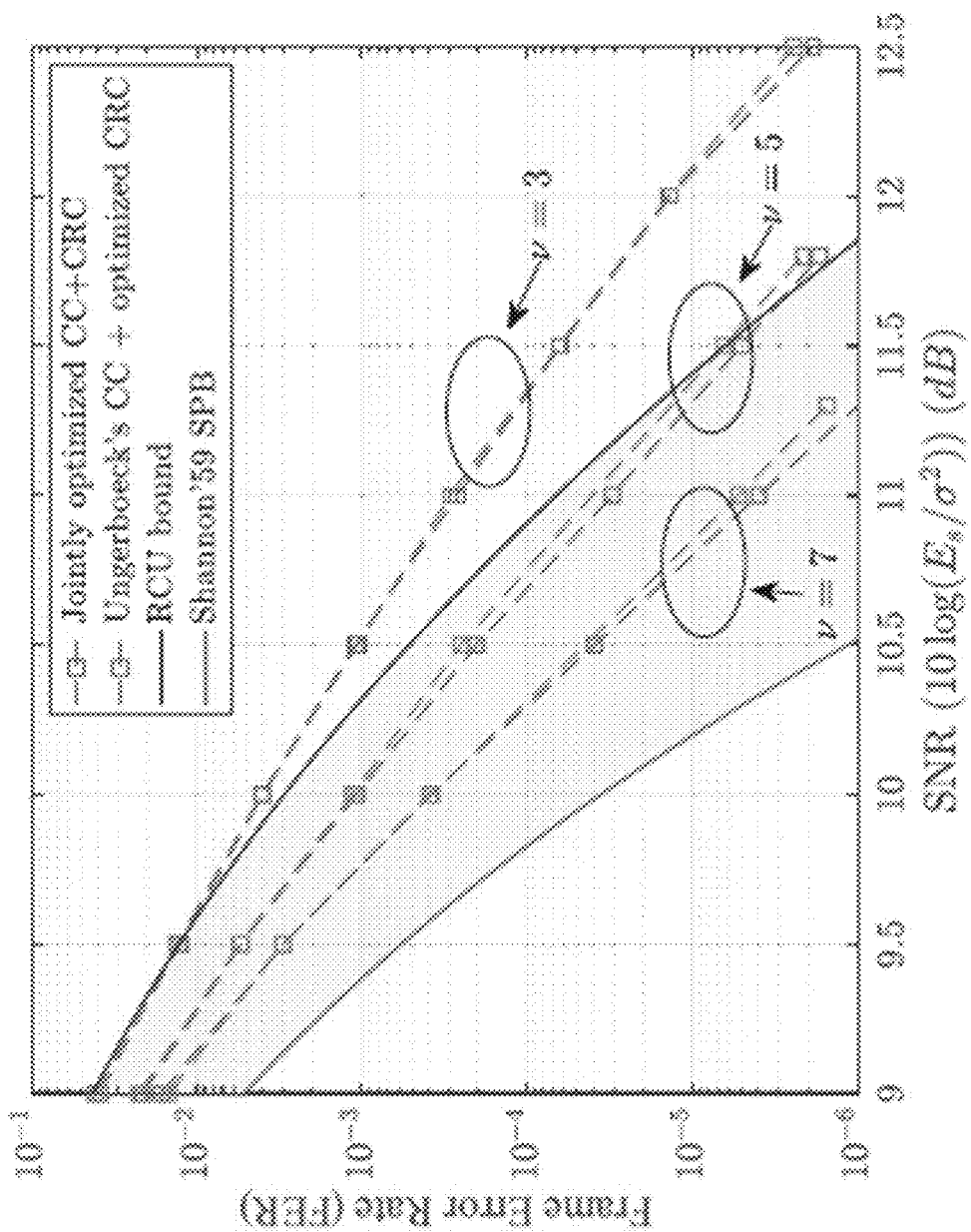
FIG. 11 illustrates FER curves of a communication system which uses a MCDM with high-probability codebook.

FIGS. 10 and 11 consider a communication system in accordance with an embodiment of the invention with k=87 input bits and n=65 output symbols. The upper bound described above can be used as an objective function to jointly optimize the CRC and CC. As a base line, the CCs optimized by Ungerboeck are adopted, and the CRC is optimized by fixing the CC. The number of memory elements of the convolutional code v=3 and 7 are considered. Table 1 lists the optimized convolutional codes and CRCs in octal form.

TABLE 1

OPTIMIZED CONVOLUTIONAL CODE AND CRC PAIRS

| v | m | $H^0(D)$ | $H^1(D)$ | $H^2(D)$ | p(x) | p'(x) |
|---|---|---|---|---|---|---|
| 3 | 2 | 13 | 06 | 00 | 5 | 7 |
| 5 | 2 | 43 | 26 | 00 | 5 | 5 |
| 7 | 2 | 211 | 142 | 000 | 5 | 5 |

The optimized CRC polynomials are denoted as p'(x) when using Ungerboeck's convolutional codes. For the joint optimization, and optimized CRC polynomial is p(x) and the optimized TBCC generator matrix is:

$$\begin{bmatrix} 1 & 0 & H^2(D)/H^0(D) \\ 0 & 1 & H^1(D)/H^0(D) \end{bmatrix}$$

FIG. 10 presents the analytical upper bounds and FERs curves of a CRC-TCM-PAS system that uses an idealized DM. Hence, the system takes length-64 i.i.d. amplitude symbols sequences with PMF P(A), encoded and modulated by CRC-aided TCM, and generates length-65 8-AM symbol sequences. The optimized CRC and CC pairs are given in Table 1. Simulation results show that the upper bound finds better CCs than those in Ungerboeck's paper.

FIG. 11 illustrates the FER curves of a communication system which uses a MCDM with high-probability codebook $c_{HP}$. The communication system also uses the CRCs and CCs in Table 1. Furthermore, the receiver uses an ML decoder. Shannon's 1959 sphere packing (SP) bound and Polyanskiy's RCU bound are also illustrated. Note that the last channel input of the communication system is uniform. When calculating the RCU bound, it is assumed that all channel inputs have the DM output distribution. FIG. 11 shows that, when a practical DM is considered, the optimized CRC and CC pairs deliver a slightly better performance than Ungerboeck's CC. When v=7, the communication system performs beyond the RCU bound. When v=5 or 7, the communication system is capable of achieving a FER that is lower than the RCU bound at specific SNRs (i.e. achieves performance that exceeds the RCU bound).

Figure 12:
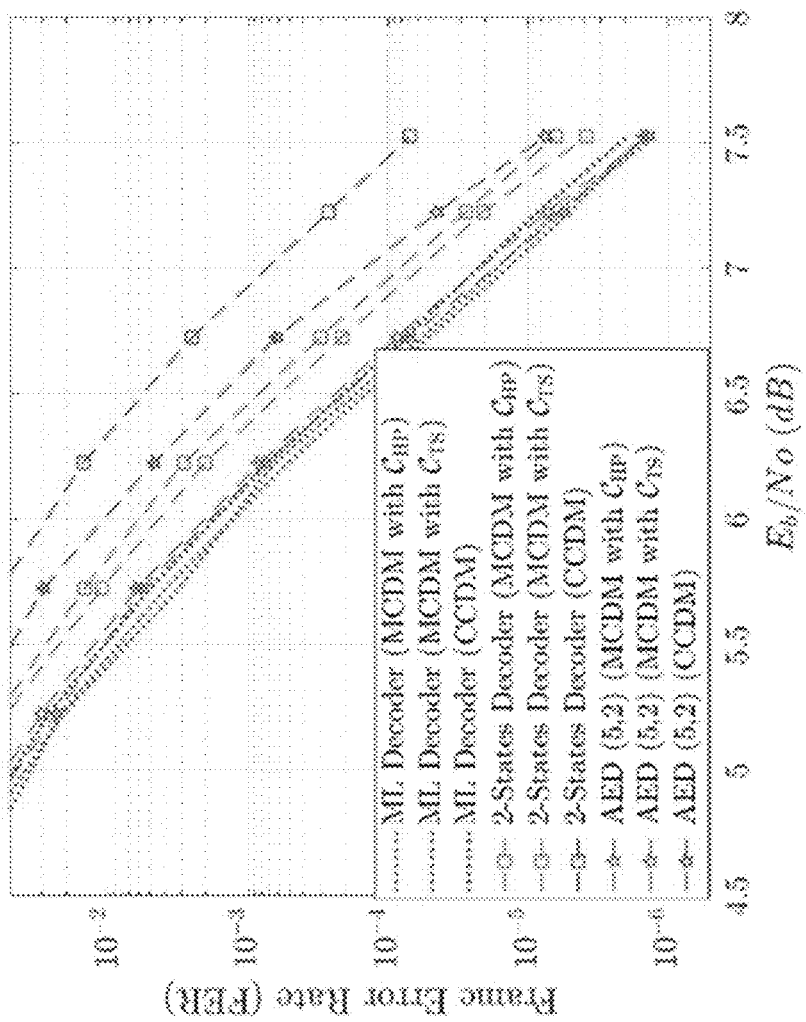
FIGS. 12 and 13 illustrate the FER performance and expected list size of various short-message communication systems.
Figure 13:
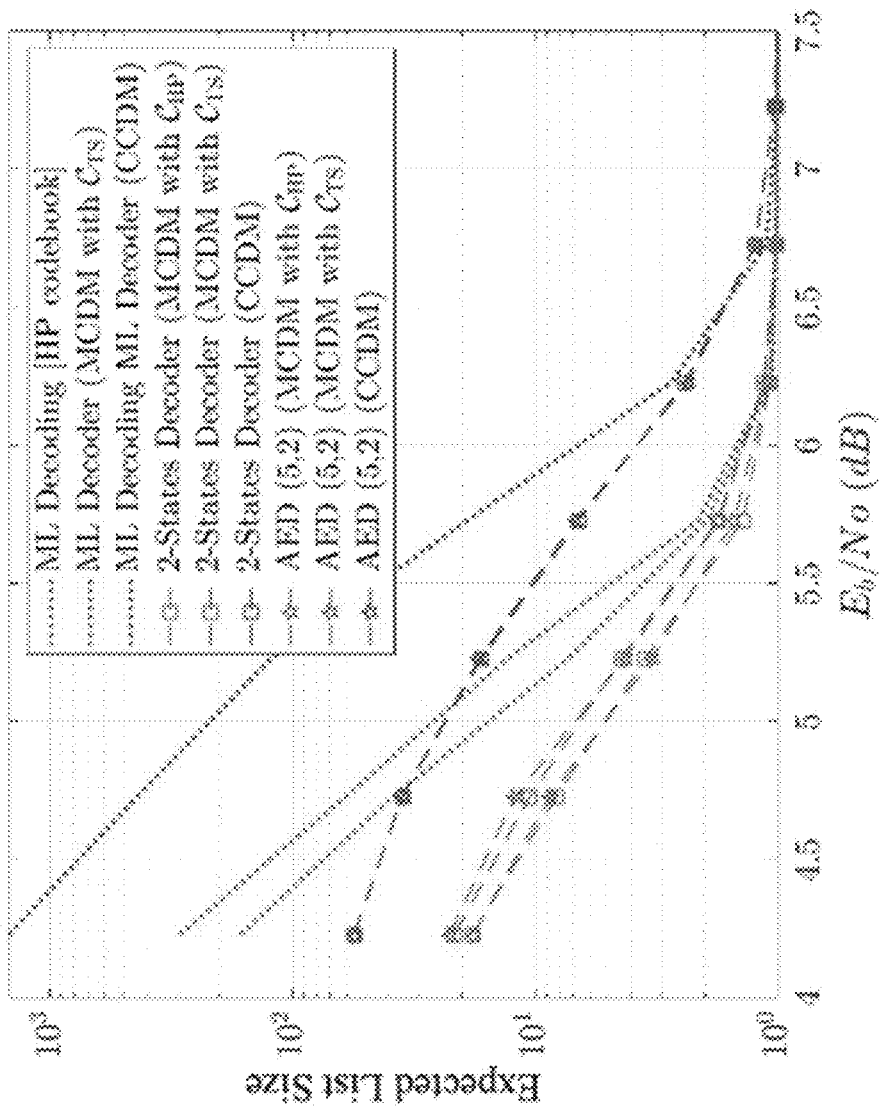

FIGS. 12 and 13 illustrate the performance of communication systems that utilize various DMs and decoders. In the illustrated examples, the communication system has k=96 input bits and n=64 output symbols, the transmission rate is 1.5 bits/real channel. The CRC-aided TCM uses a v=7, rate-2/3 TBCC and a 2-bit CRC. FIGS. 12 and 13 give the FER performances and expected list sizes, respectively. The maximum list sizes of the 2-states decoder and the AED(5,2) are both 100.

A comparison is performed between the use of MCDMs with two different codebooks $\mathcal{C}_{HP}$ and $\mathcal{C}_{TS}$. As shown in FIG. 12, $\mathcal{C}_{TS}$ delivers a similar FER performance to $\mathcal{C}_{HP}$ with ML decoder and AED(5,2), but is inferior to $\mathcal{C}_{HP}$ by about 0.1 dB with the 2-states decoder. Using $\mathcal{C}_{HP}$ and $\mathcal{C}_{TS}$, the AED(5,2) has near-ML decoding performance. FIG. 13 shows that $\mathcal{C}_{HP}$ can require less expected list size than $\mathcal{C}_{TS}$. One advantage of $\mathcal{C}_{TS}$ is that it uses a much smaller number of children CCDMs than $\mathcal{C}_{HP}$. In this example, $\tau_{HP}=2535$ and $\tau_{TS}=327$.

The performance of communication system that utilize a CCDM is also illustrated in FIGS. 12 and 13. FIG. 12 shows that even though a CCDM can be inferior to an MCDM within 0.1 dB with the use of an ML decoder, the FER degrades significantly when the decoder considers only 2 states with maximum list size 100. FIG. 13 further illustrates that the CCDM has a larger expected list size than the MCDM. If the maximum list size is not constrained, the expected list size for a CCDM can get significantly large. For example, the expected list size of ML decoders for CCDM and MCDM with $\mathcal{C}_{HP}$, $\mathcal{C}_{TS}$ at 10 dB are 122, 7 and 13, respectively.

FIG. 14 shows a comparison of the decoding performance of communication systems implemented in accordance with various embodiments of the invention and other PAS systems that use various FEC codes. All systems have 96 input bits, and the transmission rate is 1.5 bits/real channel use. For the communication system implemented in accordance with various embodiments of the invention, two distribution matchers are considered, i.e., MCDM with CTS and CCDM, and the AED(5,2) with a maximum list size of 100 is used as the decoder. FIG. 14 shows that implementing the communication system using an MCDM delivers the best performance and outperforms the CRC-Polar-PAS system by nearly 1 dB. Note that the near 1 dB gain can come from either the choice of DM or the coded modulation scheme. FIG. 14 also shows the performance of a communication system implemented with a CCDM to rule out the effect on the choice of DM. Hence, the gap between the FER curves of the communication system with a CCDM and the CRC-Polar-PAS system with a CCDM implies the unexpected gain that a classical CC can achieve over a modern Polar code, and the gap between the FER curves of the communication system implemented using a CCDM in accordance with an embodiment of the invention and the implementation that utilizes an MCDM implies the gain of the MCDM over the CCDM.

Figure 15:
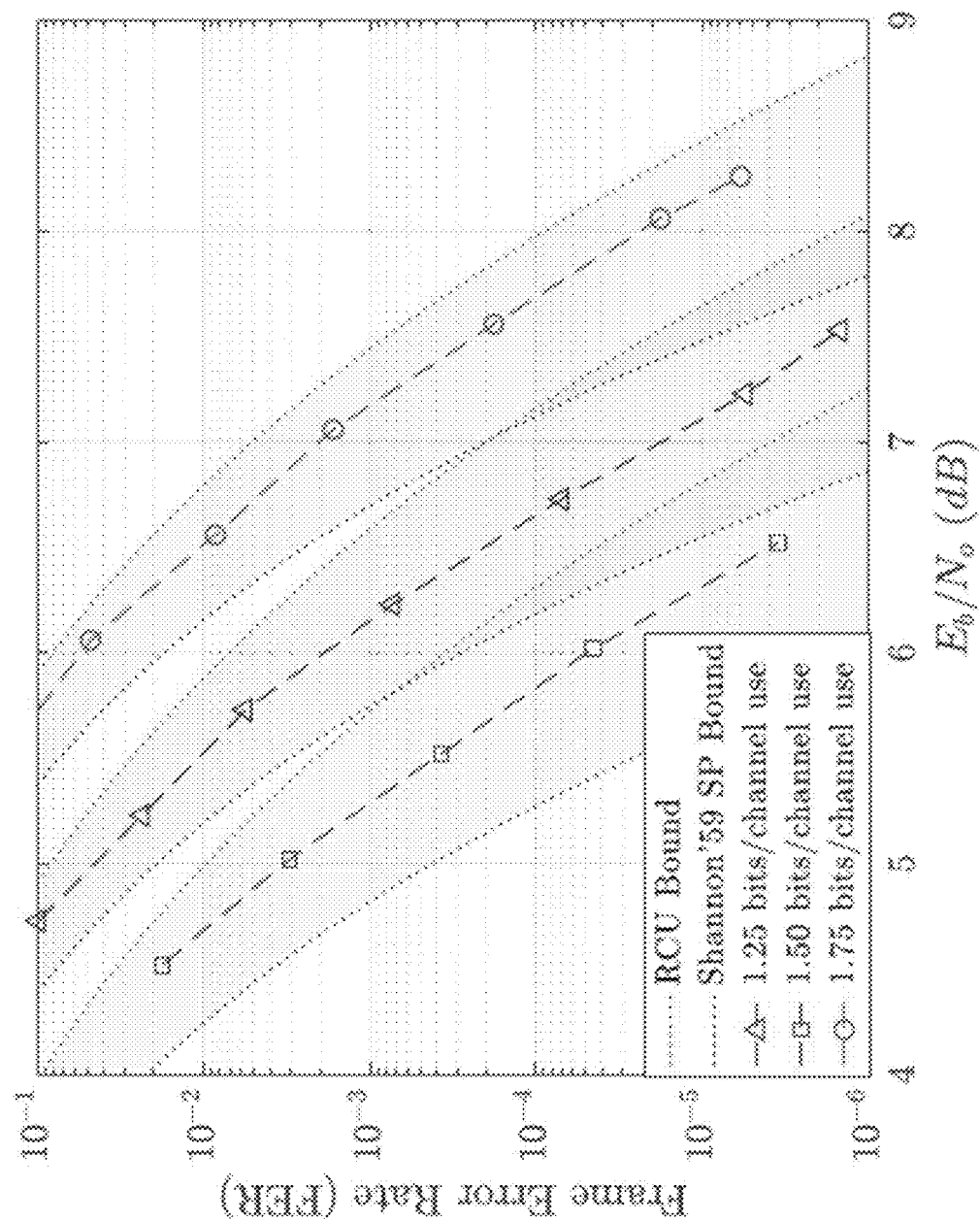
FIG. 15 illustrates the performance of a communication system implemented in accordance with various embodiments of the invention at various transmission rates

FIG. 15 illustrates the performance of a communication system implemented in accordance with various embodiments of the invention at various transmission rates. Three communication systems are implemented that take 80, 96, and 112 information bits, respectively, and generate 64 8-ASK symbols. The resultant transmission rates are 1.25, 1.50, and 1.75 bits/real channel use, respectively. The distribution matcher is implemented as an MCDM with code book $\mathcal{C}_{HP}$ for all three transmission rates. All three transmission rates employ the 7-element convolutional code and the 2-bit CRC in Table 1. An AED(5,2) with a maximum list size of 100 is used as the decoder for all transmission rates. FIG. 14 provides the FER curves of all three transmission rates. As references, the RCU bound and Shannon's '59 SP bound for each transmission rate are also given. The simulation result shows that the FER curves for all three rates lie between the RCU and the SP bound, which indicate excellent decoding performances.

While specific communication systems are described above that are designed to receive specific numbers of information bits, utilize specific distribution matchers, and transmit at specific rates using specific modulation schemes, it should be readily appreciated that communication systems in accordance with various embodiments of the invention can be implemented in any of a variety of different ways using error detection codes and CCs that are designed using the optimization techniques described herein. Furthermore, references to specific parameters such as (but not limited to) the number of error detection check bits and the number of elements in the CCs that are utilized are for illustrative purpose and that embodiments of the invention are not limited to the specific combinations of parameters described herein. The particular parameters that are selected in any given communication system implemented in accordance with various embodiments of the invention are largely dependent upon the requirements of specific applications.

Influence of Number of Memory Elements of the CC on System Performance

Figures 16, 17:
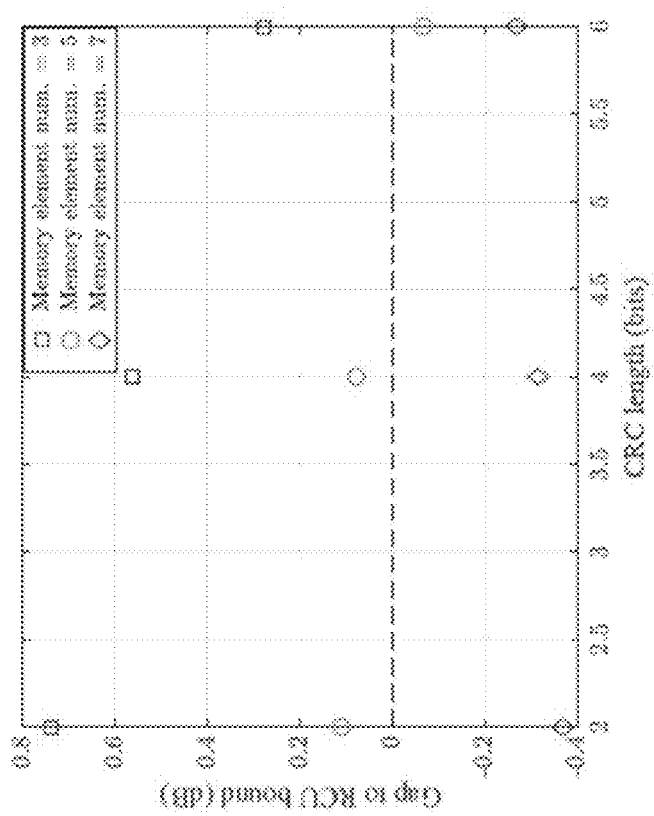
FIG. 16 shows the gaps to Polyanskiy's RCU bound of a communication system with various CRC lengths and numbers of memory elements v at a FER of $10^{-4}$.
FIG. 17 species the transmission rates of the communication systems illustrated in FIG. 16.

FIG. 16 shows the gaps to Polyanskiy's RCU bound of a communication system with various CRC lengths and numbers of memory elements v at the FER of $10^{-4}$. The negative values shown in FIG. 16 indicate the dB values at which communication systems in accordance with various embodiments of the invention can outperform Polyanskiy's RCU bound at a FER of $10^{-4}$. The transmissions illustrated in FIG. 16 correspond to different numbers of CRC bits and are listed in the table shown in FIG. 17. Simulation results show that increasing v improves the gap greatly. For v=7, communication systems with all investigated CRC lengths outperformed Polyanskiy's RCU bound and the largest performance improvements were observed with two check bits. When fewer memory elements are available, however, increasing the number of check bits can improve performance (e.g. using 6 CRC bits when v=5 enables the system to outperform Polyanskiy's RCU bound). As can readily be appreciated, the specific error detection code lengths and/or CC memory elements that are utilized by a communication system implemented in accordance with various embodiments is largely dependent upon the requirements of specific applications.

Although the present invention has been described above in certain specific aspects, many additional modifications and variations would be apparent to those skilled in the art. It is therefore to be understood that the present invention may be practiced otherwise than specifically described including using any of a variety of DM, error detection encoders, CCs and/or modulation schemes within communication systems designed to communicate via AWGN and/or fading channels as appropriate to the requirements of a given application. Thus, embodiments of the present invention should be considered in all respects as illustrative and not restrictive. Accordingly, the scope of the invention should be determined not by the examples illustrated, but by the appended claims and their equivalents.

What is claimed is:

1. A transmitter comprising:
    (a) an encoder configured to utilize a distribution matcher, an error detection encoder, and a trellis-coded-modulation encoder to process a sequence of binary message bits to produce an output sequence of modulation symbols;
    (b) wherein the distribution matcher is configured to take as input the sequence of binary message bits and produce as output a sequence of symbols that belong to a distribution matcher codebook, wherein the distribution matcher codebook produces output symbols that approximate a finite-support probability mass function;
(c) wherein the error detection encoder is configured to take as input a binary representation of the sequence of symbols output by the distribution matcher and produce as output an error detection codeword, where:
(i) the error detection codeword is based on an error detection code polynomial, and
(ii) said error detection codeword is a longer binary sequence than the binary representation of the sequence of symbols output by the distribution matcher;
(d) wherein the trellis-coded-modulation encoder comprises:
(i) a convolutional encoder configured to take as input a binary input obtained from the error detection codeword and produce a convolution encoder output sequence; and
(ii) a signal mapper configured to produce the output sequence of modulation symbols responsive to the convolutional encoder output sequence; and
(e) wherein an input to the trellis-coded-modulation encoder is a result of processing by both the distribution matcher and the error detection encoder.

2. The transmitter of claim 1, wherein the distribution matcher is a shell mapping distribution matcher.

3. The transmitter of claim 1, wherein the distribution matcher is a constant composition distribution matcher.

4. The transmitter of claim 1, wherein the distribution matcher is a multi-composition distribution matcher.

5. The transmitter of claim 1, wherein the trellis-coded-modulation encoder is characterized in that the convolutional code is optimized for a performance metric based upon the finite-support probability mass function of the distribution matcher.

6. The transmitter of claim 5, wherein the performance metric is a union bound on frame error rate at one or more specified signal-to-noise ratios.

7. The transmitter of claim 1, wherein the trellis-coded-modulation encoder is characterized in that the convolutional code is optimized to maximize minimum distance between two codewords of a code produced by concatenating the polynomial of the error detection encoder and the convolutional encoder polynomial.

8. The transmitter of claim 1, wherein the distribution matcher codebook is selected so that the modulation symbols at the output of the trellis-coded-modulation encoder approximate a mutual-information optimized finite-support probability mass function.

9. The transmitter of claim 1, wherein the error detection encoder is characterized in that the polynomial of the error detection encoder is optimized for a performance metric based upon implementations of the distribution matcher, and the convolutional encoder.

10. The transmitter of claim 9, wherein the performance metric is the union bound on frame error rate at one or more specified signal-to-noise ratios.

11. The transmitter of claim 9, wherein the performance metric is the minimum distance of the code produced by concatenating the polynomial of the error detection encoder and a convolutional encoder polynomial.

12. The transmitter of claim 1, wherein the convolutional encoder is an encoder for a tail-biting convolutional code.

13. The transmitter of claim 1, wherein the convolutional encoder enforces a constraint that a codeword terminates in a zero state.

14. A transmitter comprising:
(a) an encoder configured to utilize a distribution matcher, an error detection encoder, and a trellis-coded-modulation encoder to process a sequence of binary message bits to produce an output sequence of modulation symbols;
(b) wherein the error detection encoder is configured to take as input the sequence of binary message bits and produce as output an error detection codeword, where:
(i) the error detection codeword is based on an error detection code polynomial, and
(ii) said error detection codeword is a longer binary sequence than the sequence of binary message bits;
(c) wherein the distribution matcher is configured to take as input the error detection codeword and produce as output a sequence of symbols that belong to a distribution matcher codebook, wherein the distribution matcher codebook produces output symbols that approximate a finite-support probability mass function;
(d) wherein the trellis-coded-modulation encoder comprises:
(i) a convolutional encoder configured to take as input a binary representation of the sequence of symbols output by the distribution matcher and produce a convolution encoder output sequence; and
(ii) a signal mapper configured to produce the output sequence of modulation symbols responsive to the convolutional encoder output sequence; and
(e) wherein an input to the trellis-coded-modulation encoder is a result of processing by both the distribution matcher and the error detection encoder.

15. The transmitter of claim 14, wherein the distribution matcher is a shell mapping distribution matcher.

16. The transmitter of claim 14, wherein the distribution matcher is a constant composition distribution matcher.

17. The transmitter of claim 14, wherein the distribution matcher is a multi-composition distribution matcher.

18. The transmitter of claim 14, wherein the trellis-coded-modulation encoder is characterized in that the convolutional code is optimized for a performance metric based upon the finite-support probability mass function of the distribution matcher.

19. The transmitter of claim 18, wherein the performance metric is a union bound on frame error rate at one or more specified signal-to-noise ratios.

20. The transmitter of claim 14, wherein the trellis-coded-modulation encoder is characterized in that the convolutional code is optimized to maximize minimum distance between two codewords of a code produced by concatenating the polynomial of the error detection encoder and the convolutional encoder polynomial.

21. The transmitter of claim 14, wherein the distribution matcher codebook is selected so that the modulation symbols at the output of the trellis-coded-modulation encoder approximate a mutual-information optimized finite-support probability mass function.

22. The transmitter of claim 14, wherein the error detection encoder is characterized in that the polynomial of the error detection encoder is optimized for a performance metric based upon implementations of the distribution matcher, and the convolutional encoder.

23. The transmitter of claim 22, wherein the performance metric is the union bound on frame error rate at one or more specified signal-to-noise ratios.

24. The transmitter of claim 22, wherein the performance metric is the minimum distance of the code produced by concatenating the polynomial of the error detection encoder and a convolutional encoder polynomial.

26. The transmitter of claim 14, wherein the convolutional encoder is an encoder for a tail-biting convolutional code.

26. The transmitter of claim 14, wherein the convolutional encoder enforces a constraint that a codeword terminates in a zero state.

* * * * *